United States Patent
Wenzel et al.

(10) Patent No.: US 12,282,306 B2
(45) Date of Patent: Apr. 22, 2025

(54) CONTROL SYSTEM FOR BUILDING EQUIPMENT WITH DYNAMIC CAPACITY CONSTRAINTS

(71) Applicant: Johnson Controls Tyco IP Holdings LLP, Milwaukee, WI (US)

(72) Inventors: Michael J. Wenzel, Grafton, WI (US); Anas W. I. Alanqar, Milwaukee, WI (US); Matthew J. Asmus, Watertown, WI (US); Ryan A Baumgartner, Milwaukee, WI (US); Ryan C. Beaty, Milwaukee, WI (US); Shawn A. Schlagenhaft, Fond du Lac, WI (US); Homero L. Noboa, Waukesha, WI (US); Steven R. Vitullo, Milwaukee, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 313 days.

(21) Appl. No.: 17/733,786

(22) Filed: Apr. 29, 2022

(65) Prior Publication Data

US 2023/0350365 A1    Nov. 2, 2023

(51) Int. Cl.
*G05B 19/042* (2006.01)
*H02J 3/00* (2006.01)

(52) U.S. Cl.
CPC .............. *G05B 19/042* (2013.01); *H02J 3/00* (2013.01); *G05B 2219/2639* (2013.01)

(58) Field of Classification Search
CPC .......... G05B 19/042; G05B 2219/2639; G05B 19/0426; G05B 15/02; H02J 3/00;
(Continued)

(56) References Cited

U.S. PATENT DOCUMENTS

| 9,447,985 B2 | 9/2016 | Johnson |
| 9,612,601 B2 | 4/2017 | Beyhaghi et al. |

(Continued)

FOREIGN PATENT DOCUMENTS

| CA | 2957726 A1 | 3/2016 |
| CA | 3043996 A1 | 2/2018 |

(Continued)

OTHER PUBLICATIONS

Hanson, S., Schwedler, M. and Bakkum, B., 2011. Trane, Applications Engineering Manual: Chiller System Design and Control. Report: SYS-APM001-EN. (Year: 2011).*

(Continued)

*Primary Examiner* — Alicia M. Choi
(74) *Attorney, Agent, or Firm* — Foley & Lardner LLP

(57) ABSTRACT

A method includes providing a control algorithm that may include a constraint constraining production of the equipment below maximum values for a plurality of time steps, and dynamically adjusting the constraint by updating the maximum values as a function of predicted values of a dynamic variable for the plurality of time step. The dynamic variable affects an actual maximum production of the equipment. The method includes determining control decisions for the plurality of time steps by executing the control algorithm and controlling the equipment in accordance with the control decisions.

20 Claims, 19 Drawing Sheets

(58) Field of Classification Search
CPC ......... G06Q 10/04; G06Q 50/06; F24F 11/64; F24F 11/47
See application file for complete search history.

(56) References Cited

U.S. PATENT DOCUMENTS

| | | | |
|---|---|---|---|
| 10,101,731 B2 | 10/2018 | Asmus et al. | |
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 11,221,156 B2 | 1/2022 | Willmott et al. | |
| 2003/0055798 A1 | 3/2003 | Hittle et al. | |
| 2015/0241856 A1* | 8/2015 | Walser | G05B 19/048 700/275 |
| 2015/0316902 A1 | 11/2015 | Wenzel et al. | |
| 2015/0316907 A1 | 11/2015 | Elbsat et al. | |
| 2016/0209852 A1 | 7/2016 | Beyhaghi et al. | |
| 2017/0104345 A1 | 4/2017 | Wenzel et al. | |
| 2017/0152310 A1 | 6/2017 | Barbour et al. | |
| 2018/0194191 A1* | 7/2018 | Suzuki | B60H 1/00921 |
| 2018/0196456 A1 | 7/2018 | Elbsat | |
| 2018/0197253 A1 | 7/2018 | Elbsat et al. | |
| 2018/0285800 A1 | 10/2018 | Wenzel et al. | |
| 2018/0357577 A1 | 12/2018 | Elbsat et al. | |
| 2019/0063774 A1* | 2/2019 | Nakajima | G05B 13/048 |
| 2019/0079473 A1 | 3/2019 | Kumar et al. | |
| 2019/0323718 A1 | 10/2019 | Willmott et al. | |
| 2019/0338972 A1* | 11/2019 | Schuster | F24F 11/38 |
| 2020/0241577 A1 | 7/2020 | Fread et al. | |
| 2020/0355391 A1* | 11/2020 | Wenzel | F24F 11/65 |
| 2021/0018211 A1* | 1/2021 | Ellis | F24F 11/72 |

FOREIGN PATENT DOCUMENTS

| | | | | |
|---|---|---|---|---|
| CN | 109543221 A | * | 3/2019 | ............. G06F 30/20 |
| EP | 1 156 286 A2 | | 11/2001 | |
| EP | 3 186 687 A4 | | 7/2017 | |
| EP | 3 497 377 A1 | | 6/2019 | |
| WO | WO-2012/161804 A1 | | 11/2012 | |
| WO | WO-2013/130956 A1 | | 9/2013 | |

OTHER PUBLICATIONS

Sala-Cardoso, E., Delgado-Prieto, M., Kampouropoulos, K. and Romeral, L., 2020. Predictive chiller operation: A data-driven loading and scheduling approach. Energy and Buildings, 208, p. 109639. (Year: 2020).*
Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review, 2013 IEEE International Conference on Automation Science and Engineering, Model Predictive Control for HVAC Systems—A Review," 2013 IEEE International Conference on Automation Science and Engineering (CASE), Madison, WI, United States, Aug. 17-20, 2013 (pp. 442-447).
McKenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).

(56) References Cited

OTHER PUBLICATIONS

Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).
CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
U.S. Appl. No. 17/668,791, filed Feb. 10, 2022, Johnson Controls Tyco IP Holdings LLP.
U.S. Appl. No. 17/686,320, filed Mar. 3, 2022, Johnson Controls Tyco IP Holdings LLP.

\* cited by examiner

Partload Data (CEFT constant) — 800

| % Load | Net Capacity (Tons) | % Power | Input Power (kW) | EEFT (°F) | ELFT (°F) | CEFT (°F) | CLFT (°F) | kW/Ton.R |
|---|---|---|---|---|---|---|---|---|
| 100 | 3500 | 100 | 1582 | 60.11 | 44.00 | 61.88 | 80.00 | 0.4519 |
| 90 | 3150 | 85 | 1351 | 58.50 | 44.00 | 61.88 | 78.10 | 0.4288 |
| 80 | 2800 | 74 | 1168 | 56.86 | 44.00 | 61.88 | 76.25 | 0.4171 |
| 70 | 2450 | 64 | 1010 | 55.27 | 44.00 | 61.88 | 74.44 | 0.4124 |
| 60 | 2100 | 55 | 868.0 | 53.68 | 44.00 | 61.88 | 72.65 | 0.4134 |
| 50 | 1750 | 47 | 736.5 | 52.05 | 44.00 | 61.88 | 70.86 | 0.4209 |
| 40 | 1400 | 39 | 613.8 | 50.44 | 44.00 | 61.88 | 69.10 | 0.4384 |
| 30 | 1050 | 31 | 491.4 | 48.83 | 44.00 | 61.88 | 67.32 | 0.4680 |
| 20 | 700.0 | 24 | 375.2 | 47.22 | 44.00 | 61.88 | 65.56 | 0.5359 |
| 10 | 526.3 | 20 | 316.6 | 46.42 | 44.00 | 61.88 | 64.68 | 0.6016 |

Unit Specifications — 802

| | |
|---|---|
| Model | YKWEW5K7-DKH |
| Rated Net Capacity (Tons) | 3500 |
| PLV/NPLV | --- |
| Full Load (kW/Ton.R) | 0.4519 |
| Input Power (kW) | 1582 |
| Voltage / Hz (Input) | 4160 / 60.0 |
| Job FLA (Amps) | 247 |
| LRA (Amps) | 1772 |
| Min Circuit Ampacity | 309 |
| Max Circuit Breaker Amps | 500 |
| Heat Rejection Capacity (MBtu/h) | 47.12 |
| Gear Code | MU |
| Specified Net Capacity (Tons) | 3500 |
| Refrigerant Type/Charge (lb) | R-134a/20 |
| A-Weighted SPL (dBA) | 85.5 |
| Max Motor Load (kW) | 1748 |
| Oil Cooler | Refrig Ch |
| Condenser Gas Inlet Type | Baffle |
| OptiSound Control | Y |
| Isolation Valve | Y |
| Variable Orifice | VALVE.5 |
| Starter Type | None |
| Starter Model | N/A |

— 804

| | Evaporator | Condenser |
|---|---|---|
| | Water* | Water* |
| Fluid | | |
| Tube MTl No. | 372 | 263 / 473 |
| Passes | 2* | 2* |
| Fouling Factor (hr-ft²-°F/Btu) | 0.000100* | 0.000250* |
| Entering Fluid Temp (°F) | 60.11 | 61.88 |
| Leaving Fluid Temp (°F) | 44.00* | 80.00* |
| Fluid Flow (gpm) | 5200* | 5200* |
| Fluid Pressure Drop (ft H2O) | 36.8 | 15.7 |

FIG. 8

CONTROL SYSTEM FOR BUILDING EQUIPMENT WITH DYNAMIC CAPACITY CONSTRAINTS

BACKGROUND

The present disclosure relates generally to a central plant or central energy facility configured to serve the energy loads of a building or campus. The present disclosure relates more particular to a central plant with an asset allocator configured to determine an optimal distribution of the energy loads across various subplants of the central plant.

A central plant typically includes multiple subplants configured to serve different types of energy loads. For example, a central plant may include a chiller subplant configured to serve cooling loads, a heater subplant configured to serve heating loads, and/or an electricity subplant configured to serve electric loads. A central plant purchases resources from utilities to run the subplants to meet the loads.

Some central plants include energy storage. Energy storage may be a tank of water that stores hot water for campus heating, an ice tank for campus cooling, and/or battery storage. In the presence of real-time pricing from utilities, it may be advantageous to manipulate the time that a certain resource or energy type is consumed. Instead of producing the resource exactly when it is required by the load, it can be optimal to produce that resource at a time when the production cost is low, store it, and then use it when the resource needed to produce that type of energy is more expensive. It can be difficult and challenging to optimally allocate the energy loads across the assets of the central plant.

SUMMARY

One implementation of the present disclosure is a method for controlling equipment. The method includes providing a control algorithm that may include a constraint constraining production of the equipment below maximum values for a plurality of time steps, and dynamically adjusting the constraint by updating the maximum values as a function of predicted values of a dynamic variable for the plurality of time step. The dynamic variable affects an actual maximum production of the equipment. The method includes determining control decisions for the plurality of time steps by executing the control algorithm and controlling the equipment in accordance with the control decisions.

In some embodiments, the method includes predicting the predicted values of the dynamic variable based on a weather forecast. In some embodiments, the method includes obtaining the predicted values of the dynamic variable from a weather forecast. The equipment may be a chiller and the dynamic variable may be a proxy for lift. The dynamic variable may be an outdoor air temperature.

In some embodiments, the method also includes obtaining standard equipment specification data published by a manufacturer and indicative of equipment performance under different operating conditions and finding parameters of the function based on the standard equipment specification data. The method may include affecting the dynamic variable by operating additional equipment and executing the control algorithm may include determining additional control decisions for the additional equipment.

In some embodiments, updating the maximum values as the function of the dynamic variable includes applying the function to a value of the dynamic variable and a maximum consumption of the equipment. The maximum consumption may be a maximum electrical power usage of the equipment.

In some embodiments, executing the control algorithm includes performing an optimization subject to the constraint. The control decisions may be target value for the production of the equipment.

Another implementation of the present disclosure is a system. The system may include equipment operable to produce a resource and circuitry programmed to provide a control algorithm that may include a constraint constraining production of the equipment below maximum values for a plurality of time steps and dynamically adjust the constraint by updating the maximum values as a function of predicted values of a dynamic variable for the plurality of time steps. The dynamic variable affects an actual maximum production of the equipment. The circuitry may also be programmed to determine control decisions for the plurality of time steps by executing the control algorithm and control the equipment in accordance with the control decisions.

In some embodiments, the equipment is a chiller and the dynamic variable affects lift of the chiller. In some embodiments, the system includes additional equipment configured to produce the resource and the control algorithm allocates a demand for the resource across the equipment and the additional equipment. The system may include additional equipment operable to affect the dynamic variable, wherein the circuitry is programmed to coordinate operation of the equipment and the additional equipment based on a dependence of the dynamic variable on control decisions by the circuitry for the additional equipment.

Another implementation of the present disclosure is a method of coordinating operation of a first equipment unit and a second equipment unit. The method may include determining a first relationship between production of the first equipment unit, consumption of the first equipment unit, and a dynamic variable, determining a second relationship between the dynamic variable and a control decision for the second equipment unit, coordinating operations of the first equipment unit and the second equipment unit by performing an optimization subject to one or more constraints defined based on the first relationship and the second relationship.

In some embodiments, the first equipment unit is a chiller and the second equipment unit is a cooling tower. In some embodiments, the one or more constraints include a constraint on at least one of consumption or production of the first equipment unit dependent on the first relationship. Performing the optimization may output target production amounts for the first equipment unit and the control decision for the second equipment unit.

In some embodiments, determining the second relationship further includes determining a dependence of the second relationship on a weather variable. In some embodiments, determining the first relationship is performed using equipment specification data published by a manufacturer.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 8 is an illustration of an equipment specification sheet that can be used in the process of FIG. 7, according to some embodiments.

DETAILED DESCRIPTION

Overview

Figure 1:
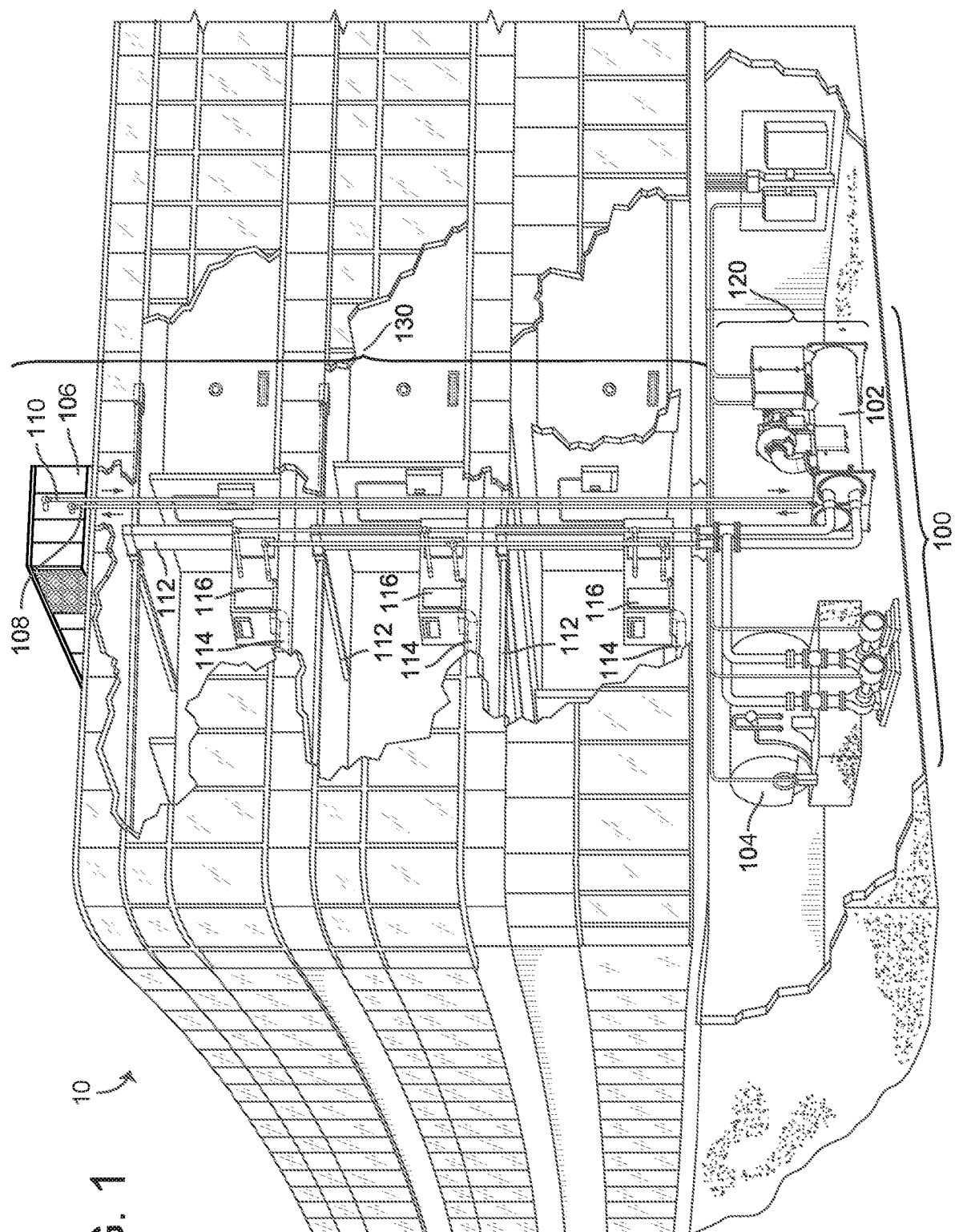
FIG. 1 is a drawing of a building equipped with a HVAC system, according to an exemplary embodiment.

Referring generally to the FIGURES, systems and methods for controlling building equipment with dynamic capacity constraints are shown, according to various exemplary embodiments. One implementation of the systems and methods described herein is a control system for building equipment of a central plant (e.g., chillers, boilers, heat recovery chillers, thermal energy storage tanks, electric generators, batteries, etc.). The central plant may include an asset allocator configured to manage energy assets such as central plant equipment, battery storage, and other types of equipment configured to serve the energy loads of a building. The asset allocator can determine an optimal distribution of heating, cooling, electricity, and energy loads across different subplants (i.e., equipment groups) of the central plant capable of producing that type of energy.

In some embodiments, the asset allocator is configured to control the distribution, production, storage, and usage of resources in the central plant. The asset allocator can be configured to minimize the economic cost (or maximize the economic value) of operating the central plant over a duration of an optimization period. The economic cost may be defined by a cost function J(x) that expresses economic cost as a function of the control decisions made by the asset allocator. The cost function J(x) may account for the cost of resources purchased from various sources, as well as the revenue generated by selling resources (e.g., to an energy grid) or participating in incentive programs.

The asset allocator can be configured to define various sources, subplants, storage, and sinks. These four categories of objects define the assets of a central plant and their interaction with the outside world. Sources may include commodity markets or other suppliers from which resources such as electricity, water, natural gas, and other resources can be purchased or obtained. Sinks may include the requested loads of a building or campus as well as other types of resource consumers. Subplants are the main assets of a central plant. Subplants can be configured to convert resource types, making it possible to balance requested loads from a building or campus using resources purchased from the sources. Storage can be configured to store energy or other types of resources for later use.

In some embodiments, the asset allocator performs an optimization process to determine an optimal set of control decisions for each time step within the optimization period. The control decisions may include, for example, an optimal amount of each resource to purchase from the sources, an optimal amount of each resource to produce or convert using the subplants, an optimal amount of each resource to store or remove from storage, an optimal amount of each resource to sell to resources purchasers, and/or an optimal amount of each resource to provide to other sinks. In some embodiments, the asset allocator is configured to optimally dispatch all campus energy assets (i.e., the central plant equipment) in order to meet the requested heating, cooling, and electrical loads of the campus for each time step within the optimization period. These and other features of the asset allocator are described in greater detail below.

In some embodiments, the teachings herein are performed for a building equipment or combination of building equipment other than in the context of asset allocation in a central plant. For example, control of building equipment using dynamic capacity constraints may be performed for an individual equipment unit such as a chiller (e.g., locally on the chiller, using a cloud server in combination with a chiller), rooftop unit, variable refrigerant flow system, air conditioner, boiler, furnace, heater, ventilation equipment, etc. All such variations are within the scope of the present disclosure.

Building and HVAC System

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant

Figure 2:
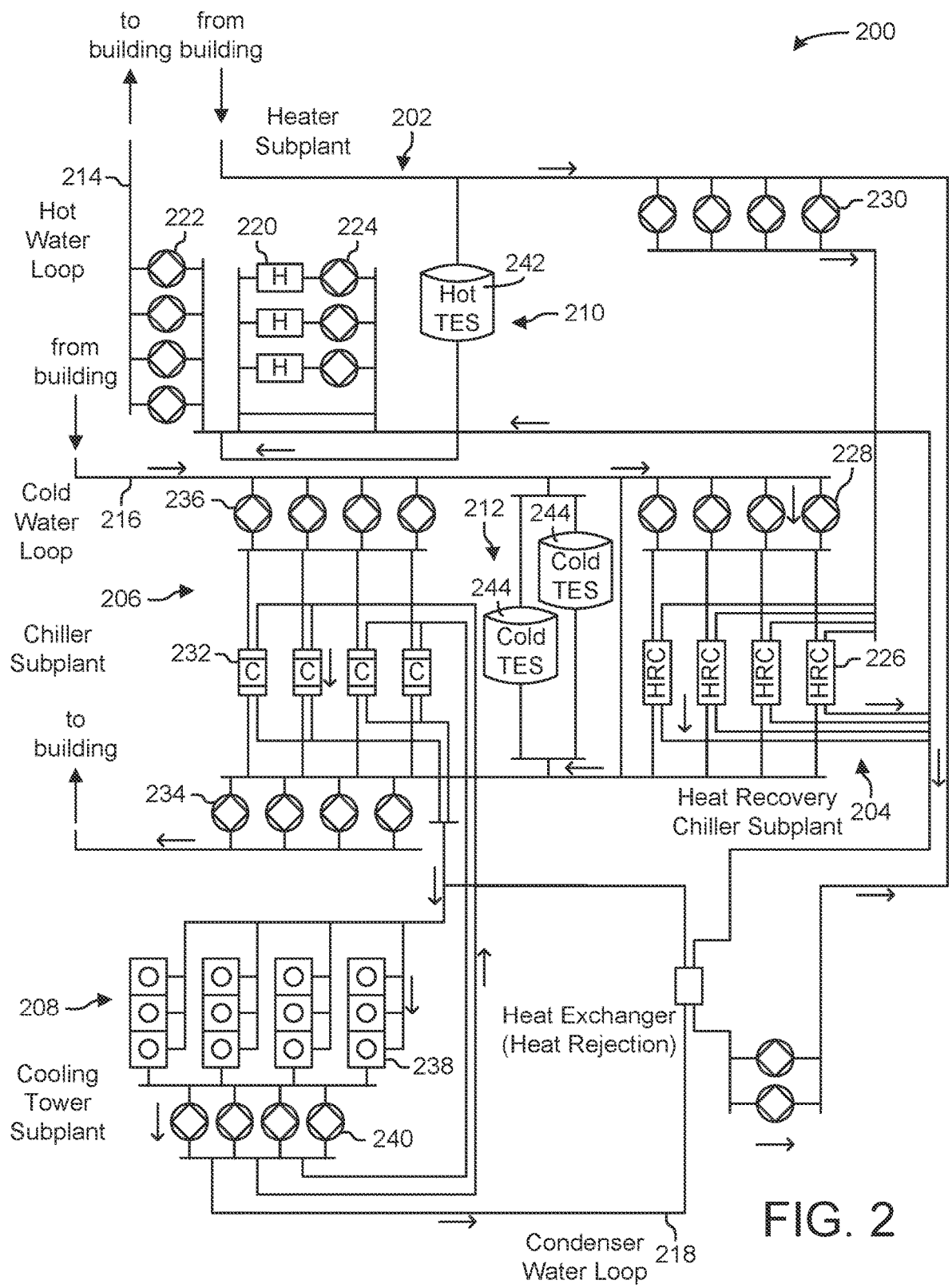
FIG. 2 is a block diagram of a central plant which can be used to serve the energy loads of the building of FIG. 1, according to an exemplary embodiment.

Referring now to FIG. 2, a block diagram of a central plant 200 is shown, according to some embodiments. In various embodiments, central plant 200 can supplement or replace waterside system 120 in HVAC system 100 or can be implemented separate from HVAC system 100. When implemented in HVAC system 100, central plant 200 can include a subset of the HVAC devices in HVAC system 100 (e.g., boiler 104, chiller 102, pumps, valves, etc.) and may operate to supply a heated or chilled fluid to AHU 106. The HVAC devices of central plant 200 can be located within building 10 (e.g., as components of waterside system 120) or at an offsite location such as a central energy facility that serves multiple buildings.

Central plant 200 is shown to include a plurality of subplants 202-208. Subplants 202-208 can be configured to convert energy or resource types (e.g., water, natural gas, electricity, etc.). For example, subplants 202-208 are shown to include a heater subplant 202, a heat recovery chiller subplant 204, a chiller subplant 206, and a cooling tower subplant 208. In some embodiments, subplants 202-208 consume resources purchased from utilities to serve the energy loads (e.g., hot water, cold water, electricity, etc.) of a building or campus. For example, heater subplant 202 can be configured to heat water in a hot water loop 214 that circulates the hot water between heater subplant 202 and building 10. Similarly, chiller subplant 206 can be configured to chill water in a cold water loop 216 that circulates the cold water between chiller subplant 206 building 10.

Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. In various embodiments, central plant 200 can include an electricity subplant (e.g., one or more electric generators) configured to generate electricity or any other type of subplant configured to convert energy or resource types.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-208 to receive further heating or cooling.

Although subplants 202-208 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-208 may provide heating and/or cooling directly to the building or campus without requiring an intermediate heat transfer fluid. These and other variations to central plant 200 are within the teachings of the present disclosure.

Each of subplants 202-208 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, one or more of the pumps in central plant 200 (e.g., pumps 222, 224, 228, 230, 234, 236, and/or 240) or pipelines in central plant 200 include an isolation valve associated therewith. Isolation valves can be integrated with the pumps or positioned upstream or downstream of the pumps to control the fluid flows in central plant 200. In various embodiments, central plant 200 can include more, fewer, or different types of devices and/or subplants based on the particular configuration of central plant 200 and the types of loads served by central plant 200.

Still referring to FIG. 2, central plant 200 is shown to include hot thermal energy storage (TES) 210 and cold thermal energy storage (TES) 212. Hot TES 210 and cold TES 212 can be configured to store hot and cold thermal energy for subsequent use. For example, hot TES 210 can include one or more hot water storage tanks 242 configured to store the hot water generated by heater subplant 202 or heat recovery chiller subplant 204. Hot TES 210 may also include one or more pumps or valves configured to control the flow rate of the hot water into or out of hot TES tank 242.

Similarly, cold TES 212 can include one or more cold water storage tanks 244 configured to store the cold water generated by chiller subplant 206 or heat recovery chiller subplant 204. Cold TES 212 may also include one or more pumps or valves configured to control the flow rate of the cold water into or out of cold TES tanks 244. In some embodiments, central plant 200 includes electrical energy storage (e.g., one or more batteries) or any other type of device configured to store resources. The stored resources can be purchased from utilities, generated by central plant 200, or otherwise obtained from any source.

Airside System

Figure 3:
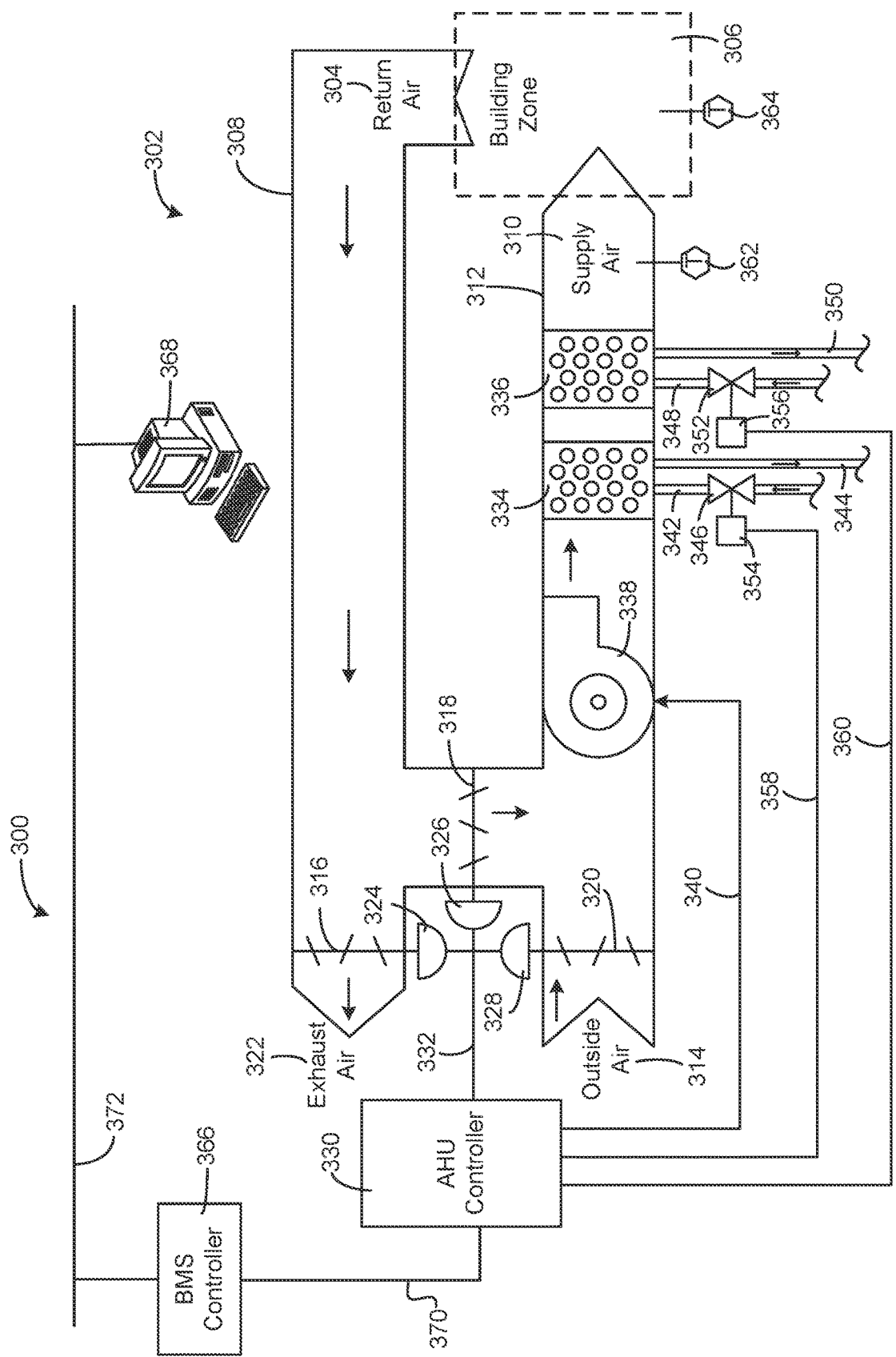
FIG. 3 is a block diagram of an airside system which can be implemented in the building of FIG. 1, according to an exemplary embodiment.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by central plant 200.

Airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from central plant 200 (e.g., from cold water loop 216) via piping 342 and may return the chilled fluid to central plant 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from central plant 200 (e.g., from hot water loop 214) via piping 348 and may return the heated fluid to central plant 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, central plant 200, HVAC system 100, and/or other controllable systems that serve building 10. BMS controller 366 may communicate with multiple downstream building systems or subsystems (e.g., HVAC system 100, a security system, a lighting system, central plant 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Asset Allocation System

Figure 4:
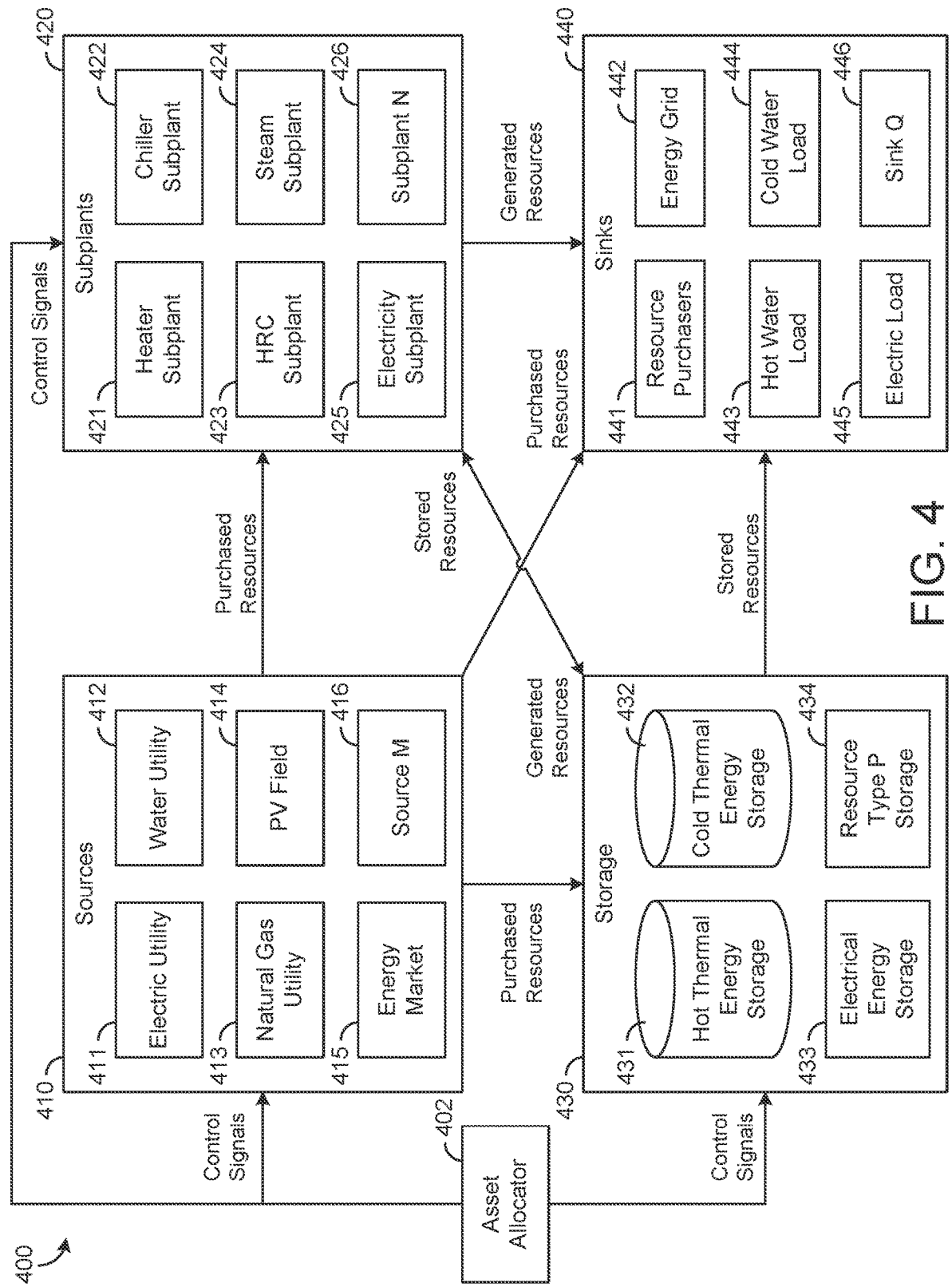
FIG. 4 is a block diagram of an asset allocation system including sources, subplants, storage, sinks, and an asset allocator configured to optimize the allocation of these assets, according to according to some embodiments.

Referring now to FIG. 4, a block diagram of an asset allocation system 400 is shown, according to an exemplary embodiment. Asset allocation system 400 can be configured to manage energy assets such as central plant equipment, battery storage, and other types of equipment configured to serve the energy loads of a building. Asset allocation system 400 can determine an optimal distribution of heating, cooling, electricity, and energy loads across different subplants (i.e., equipment groups) capable of producing that type of energy. In some embodiments, asset allocation system 400 is implemented as a component of central plant 200 and interacts with the equipment of central plant 200 in an online operational environment (e.g., performing real-time control of the central plant equipment). In other embodiments, asset allocation system 400 can be implemented as a component of a planning tool (described with reference to FIGS. 7-8) and can be configured to simulate the operation of a central plant over a predetermined time period for planning, budgeting, and/or design considerations.

Asset allocation system 400 is shown to include sources 410, subplants 420, storage 430, and sinks 440. These four categories of objects define the assets of a central plant and their interaction with the outside world. Sources 410 may include commodity markets or other suppliers from which resources such as electricity, water, natural gas, and other resources can be purchased or obtained. Sources 410 may provide resources that can be used by asset allocation system 400 to satisfy the demand of a building or campus. For example, sources 410 are shown to include an electric utility 411, a water utility 412, a natural gas utility 413, a photovoltaic (PV) field (e.g., a collection of solar panels), an energy market 415, and source M 416, where M is the total number of sources 410. Resources purchased from sources 410 can be used by subplants 420 to produce generated resources (e.g., hot water, cold water, electricity, steam, etc.), stored in storage 430 for later use, or provided directly to sinks 440.

Subplants 420 are shown to include a heater subplant 421, a chiller subplant 422, a heat recovery chiller subplant 423, a steam subplant 424, an electricity subplant 425, and subplant N, where N is the total number of subplants 420. In some embodiments, subplants 420 include some or all of the subplants of central plant 200, as described with reference to FIG. 2. For example, subplants 420 can include heater subplant 202, heat recovery chiller subplant 204, chiller subplant 206, and/or cooling tower subplant 208.

Subplants 420 can be configured to convert resource types, making it possible to balance requested loads from the building or campus using resources purchased from sources 410. For example, heater subplant 421 may be configured to generate hot thermal energy (e.g., hot water) by heating water using electricity or natural gas. Chiller subplant 422 may be configured to generate cold thermal energy (e.g., cold water) by chilling water using electricity. Heat recovery chiller subplant 423 may be configured to generate hot thermal energy and cold thermal energy by removing heat from one water supply and adding the heat to another water supply. Steam subplant 424 may be configured to generate steam by boiling water using electricity or natural gas. Electricity subplant 425 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by subplants 420 may be provided by sources 410, retrieved from storage 430, and/or generated by other subplants 420. For example, steam subplant 424 may produce steam as an output resource. Electricity subplant 425 may include a steam turbine that uses the steam generated by steam subplant 424 as an input resource to generate electricity. The output resources produced by subplants 420 may be stored in storage 430, provided to sinks 440, and/or used by other subplants 420. For example, the electricity generated by electricity subplant 425 may be stored in electrical energy storage 433, used by chiller subplant 422 to generate cold thermal energy, used to satisfy the electric load 445 of a building, or sold to resource purchasers 441.

Storage 430 can be configured to store energy or other types of resources for later use. Each type of storage within storage 430 may be configured to store a different type of resource. For example, storage 430 is shown to include hot thermal energy storage 431 (e.g., one or more hot water storage tanks), cold thermal energy storage 432 (e.g., one or more cold thermal energy storage tanks), electrical energy storage 433 (e.g., one or more batteries), and resource type P storage 434, where P is the total number of storage 430. In some embodiments, storage 430 include some or all of the storage of central plant 200, as described with reference to FIG. 2. In some embodiments, storage 430 includes the heat capacity of the building served by the central plant. The resources stored in storage 430 may be purchased directly from sources or generated by subplants 420.

In some embodiments, storage 430 is used by asset allocation system 400 to take advantage of price-based demand response (PBDR) programs. PBDR programs encourage consumers to reduce consumption when generation, transmission, and distribution costs are high. PBDR programs are typically implemented (e.g., by sources 410) in the form of energy prices that vary as a function of time. For example, some utilities may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in storage 430 allows for the resources to be purchased at times when the resources are relatively less expensive (e.g., during non-peak electricity hours) and stored for use at times when the resources are relatively more expensive (e.g., during peak electricity hours). Storing resources in storage 430 also allows the resource demand of the building or campus to be shifted in time. For example, resources can be purchased from sources 410 at times when the demand for heating or cooling is low and immediately converted into hot or cold thermal energy by subplants 420. The thermal energy can be stored in storage 430 and retrieved at times when the demand for heating or cooling is high. This allows asset allocation system 400 to smooth the resource demand of the building or campus and reduces the maximum required capacity of subplants 420. Smoothing the demand also asset allocation system 400 to reduce the peak electricity consumption, which results in a lower demand charge.

In some embodiments, storage 430 is used by asset allocation system 400 to take advantage of incentive-based demand response (IBDR) programs. IBDR programs provide incentives to customers who have the capability to store energy, generate energy, or curtail energy usage upon request. Incentives are typically provided in the form of monetary revenue paid by sources 410 or by an independent service operator (ISO). IBDR programs supplement traditional utility-owned generation, transmission, and distribution assets with additional options for modifying demand load curves. For example, stored energy can be sold to resource purchasers 441 or an energy grid 442 to supplement the energy generated by sources 410. In some instances, incentives for participating in an IBDR program vary based on how quickly a system can respond to a request to change power output/consumption. Faster responses may be compensated at a higher level. Advantageously, electrical energy storage 433 allows system 400 to quickly respond to a request for electric power by rapidly discharging stored electrical energy to energy grid 442.

Sinks 440 may include the requested loads of a building or campus as well as other types of resource consumers. For example, sinks 440 are shown to include resource purchasers 441, an energy grid 442, a hot water load 443, a cold water load 444, an electric load 445, and sink Q, where Q is the total number of sinks 440. A building may consume various resources including, for example, hot thermal energy (e.g., hot water), cold thermal energy (e.g., cold water), and/or electrical energy. In some embodiments, the resources are consumed by equipment or subsystems within the building (e.g., HVAC equipment, lighting, computers and other electronics, etc.). The consumption of each sink 440 over the optimization period can be supplied as an input to asset allocation system 400 or predicted by asset allocation system 400. Sinks 440 can receive resources directly from sources 410, from subplants 420, and/or from storage 430.

Figure 5:
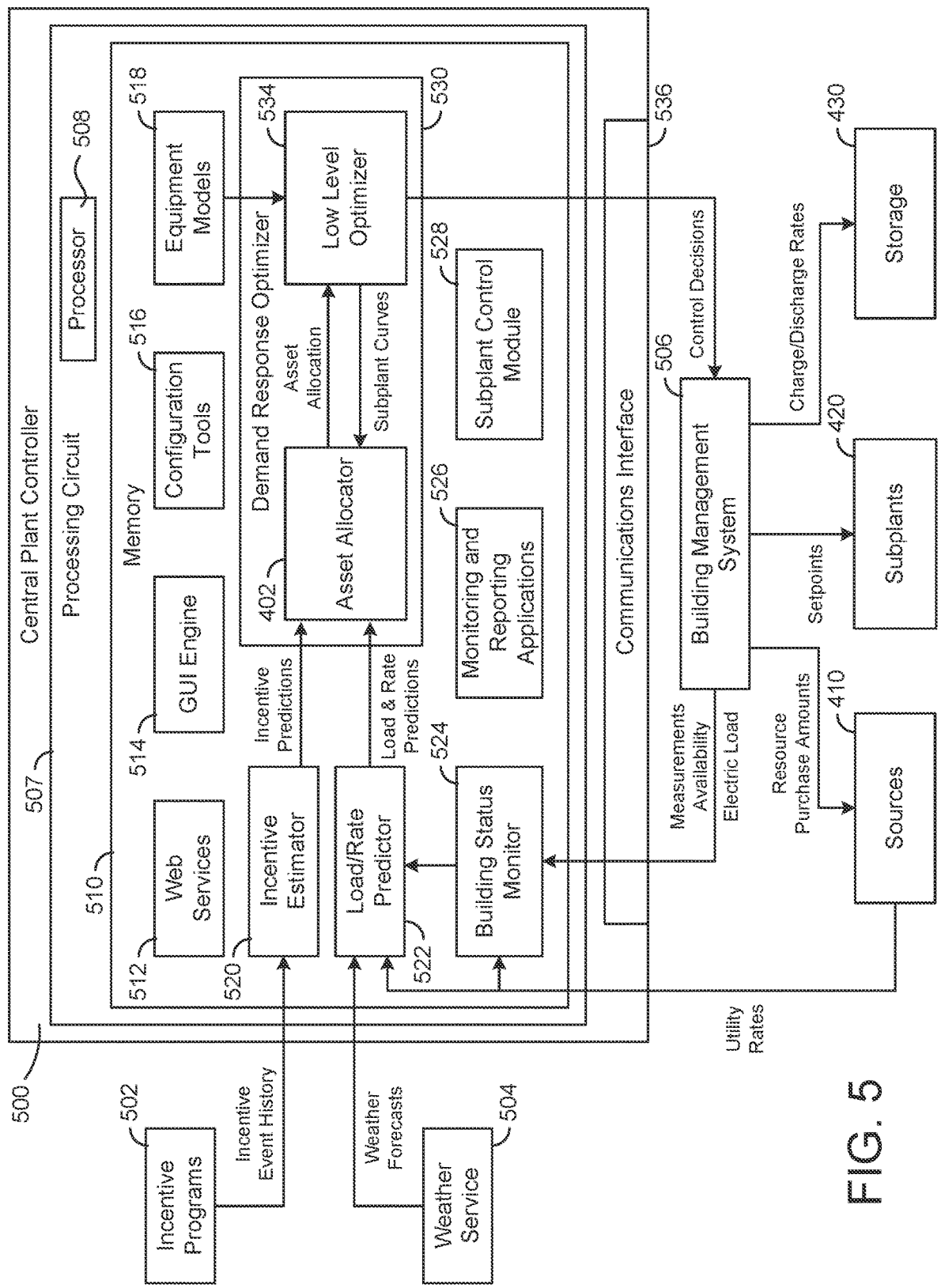
FIG. 5 is a block diagram of a central plant controller in which the asset allocator of FIG. 4 can be implemented, according to some embodiments.

Still referring to FIG. 4, asset allocation system 400 is shown to include an asset allocator 402. Asset allocator 402 can be implemented as part of a controller, computing system, cloud computing resource, etc., for example as shown in FIG. 5 and described with reference thereto. Asset allocator 402 may be configured to control the distribution, production, storage, and usage of resources in asset allocation system 400. In some embodiments, asset allocator 402 performs an optimization process determine an optimal set of control decisions for each time step within an optimization period. The control decisions may include, for example, an optimal amount of each resource to purchase from sources 410, an optimal amount of each resource to produce or convert using subplants 420, an optimal amount of each resource to store or remove from storage 430, an optimal amount of each resource to sell to resources purchasers 441 or energy grid 440, and/or an optimal amount of each resource to provide to other sinks 440. In some embodiments, the control decisions include an optimal amount of each input resource and output resource for each of subplants 420.

In some embodiments, asset allocator 402 is configured to optimally dispatch all campus energy assets in order to meet the requested heating, cooling, and electrical loads of the campus for each time step within an optimization horizon or optimization period of duration h. Instead of focusing on only the typical HVAC energy loads, the concept is extended to the concept of resource. Throughout this disclosure, the term "resource" is used to describe any type of commodity purchased from sources 410, used or produced by subplants 420, stored or discharged by storage 430, or consumed by sinks 440. For example, water may be considered a resource that is consumed by chillers, heaters, or cooling towers during operation. This general concept of a resource can be extended to chemical processing plants where one of the resources is the product that is being produced by the chemical processing plat.

Asset allocator 402 can be configured to operate the equipment of asset allocation system 400 to ensure that a resource balance is maintained at each time step of the optimization period. This resource balance is shown in the following equation:

$$\Sigma x_{time} = 0 \quad \forall \text{resources}, \forall \text{time} \in \text{horizon}$$

where the sum is taken over all producers and consumers of a given resource (i.e., all of sources 410, subplants 420, storage 430, and sinks 440) and time is the time index. Each time element represents a period of time during which the resource productions, requests, purchases, etc. are assumed constant. Asset allocator 402 may ensure that this equation is satisfied for all resources regardless of whether that resource is required by the building or campus. For example, some of the resources produced by subplants 420 may be intermediate resources that function only as inputs to other subplants 420.

In some embodiments, the resources balanced by asset allocator 402 include multiple resources of the same type (e.g., multiple chilled water resources, multiple electricity resources, etc.). Defining multiple resources of the same type may allow asset allocator 402 to satisfy the resource balance given the physical constraints and connections of the central plant equipment. For example, suppose a central plant has multiple chillers and multiple cold water storage tanks, with each chiller physically connected to a different cold water storage tank (i.e., chiller A is connected to cold water storage tank A, chiller B is connected to cold water storage tank B, etc.). Given that only one chiller can supply cold water to each cold water storage tank, a different cold water resource can be defined for the output of each chiller. This allows asset allocator 402 to ensure that the resource balance is satisfied for each cold water resource without attempting to allocate resources in a way that is physically impossible (e.g., storing the output of chiller A in cold water storage tank B, etc.).

Asset allocator 402 may be configured to minimize the economic cost (or maximize the economic value) of operating asset allocation system 400 over the duration of the optimization period. The economic cost may be defined by a cost function $J(x)$ that expresses economic cost as a function of the control decisions made by asset allocator 402. The cost function $J(x)$ may account for the cost of resources purchased from sources 410, as well as the revenue generated by selling resources to resource purchasers 441 or energy grid 442 or participating in incentive programs. The cost optimization performed by asset allocator 402 can be expressed as:

$$\underset{x}{\operatorname{argmin}} J(x)$$

where $J(x)$ is defined as follows:

$$J(x) = \sum_{sources} \sum_{horizon} \text{cost}\,(\text{purchase}_{resource,time},\,\text{time}) - \\ \sum_{incentives} \sum_{horizon} \text{revenue}\,(ReservationAmount)$$

The first term in the cost function $J(x)$ represents the total cost of all resources purchased over the optimization horizon. Resources can include, for example, water, electricity, natural gas, or other types of resources purchased from a utility or other source 410. The second term in the cost function $J(x)$ represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

Each of subplants 420 and storage 430 may include equipment that can be controlled by asset allocator 402 to optimize the performance of asset allocation system 400. Subplant equipment may include, for example, heating devices, chillers, heat recovery heat exchangers, cooling towers, energy storage devices, pumps, valves, and/or other devices of subplants 420 and storage 430. Individual devices of subplants 420 can be turned on or off to adjust the resource production of each subplant 420. In some embodiments, individual devices of subplants 420 can be operated at variable capacities (e.g., operating a chiller at 10% capacity or 60% capacity) according to an operating setpoint received from asset allocator 402. Asset allocator 402 can control the equipment of subplants 420 and storage 430 to adjust the amount of each resource purchased, consumed, and/or produced by system 400.

In some embodiments, asset allocator 402 minimizes the cost function while participating in PBDR programs, IBDR programs, or simultaneously in both PBDR and IBDR programs. For the IBDR programs, asset allocator 402 may use statistical estimates of past clearing prices, mileage ratios, and event probabilities to determine the revenue generation potential of selling stored energy to resource purchasers 441 or energy grid 442. For the PBDR programs, asset allocator 402 may use predictions of ambient conditions, facility thermal loads, and thermodynamic models of installed equipment to estimate the resource consumption of subplants 420. Asset allocator 402 may use predictions of the resource consumption to monetize the costs of running the equipment.

Asset allocator 402 may automatically determine (e.g., without human intervention) a combination of PBDR and/or IBDR programs in which to participate over the optimization horizon in order to maximize economic value. For example, asset allocator 402 may consider the revenue generation potential of IBDR programs, the cost reduction potential of PBDR programs, and the equipment maintenance/replacement costs that would result from participating in various combinations of the IBDR programs and PBDR programs. Asset allocator 402 may weigh the benefits of participation against the costs of participation to determine an optimal combination of programs in which to participate. Advantageously, this allows asset allocator 402 to determine an optimal set of control decisions that maximize the overall value of operating asset allocation system 400.

In some embodiments, asset allocator 402 optimizes the cost function $J(x)$ subject to the following constraint, which guarantees the balance between resources purchased, produced, discharged, consumed, and requested over the optimization horizon:

$$\sum_{sources} purchase_{resource,time} +$$
$$\sum_{subplants} produces\,(x_{internal,time}, x_{external,time}, v_{uncontrolled,time}) -$$
$$\sum_{subplants} consumes\,(x_{internal,time}, x_{external,time}, v_{uncontrolled,time}) +$$
$$\sum_{storages} discharges_{resource}(x_{internal,time}, x_{external,time}) - \sum_{sinks} requests_{resource} =$$
$$0\ \forall\ resources, \forall\ time \in horizon$$

where $x_{internal,time}$ includes internal decision variables (e.g., load allocated to each component of asset allocation system 400), $x_{external,time}$ includes external decision variables (e.g., condenser water return temperature or other shared variables across subplants 420), and $v_{uncontrolled,time}$ includes uncontrolled variables (e.g., weather conditions).

The first term in the previous equation represents the total amount of each resource (e.g., electricity, water, natural gas, etc.) purchased from each source 410 over the optimization horizon. The second and third terms represent the total production and consumption of each resource by subplants 420 over the optimization horizon. The fourth term represents the total amount of each resource discharged from storage 430 over the optimization horizon. Positive values indicate that the resource is discharged from storage 430, whereas negative values indicate that the resource is charged or stored. The fifth term represents the total amount of each resource requested by sinks 440 over the optimization horizon. Accordingly, this constraint ensures that the total amount of each resource purchased, produced, or discharged from storage 430 is equal to the amount of each resource consumed, stored, or provided to sinks 440.

In some embodiments, additional constraints exist on the regions in which subplants 420 can operate. Examples of such additional constraints include the acceptable space (i.e., the feasible region) for the decision variables given the uncontrolled conditions, the maximum amount of a resource that can be purchased from a given source 410, and any number of plant-specific constraints that result from the mechanical design of the plant. These additional constraints can be generated and imposed by operational domain module 904.

Asset allocator 402 may include a variety of features that enable the application of asset allocator 402 to nearly any central plant, central energy facility, combined heating and cooling facility, or combined heat and power facility. These features include broadly applicable definitions for subplants 420, sinks 440, storage 430, and sources 410; multiples of the same type of subplant 420 or sink 440; subplant resource connections that describe which subplants 420 can send resources to which sinks 440 and at what efficiency; subplant minimum turndown into the asset allocation optimization; treating electrical energy as any other resource that must be balanced; constraints that can be commissioned during runtime; different levels of accuracy at different points in the horizon; setpoints (or other decisions) that are shared between multiple subplants included in the decision vector; disjoint subplant operation regions; incentive based electrical energy programs; and high level airside models. Incorporation of these features may allow asset allocator 402 to support a majority of the central energy facilities that will be seen in the future. Additionally, it will be possible to rapidly adapt to the inclusion of new subplant types. Some of these features are described in greater detail below.

Broadly applicable definitions for subplants 420, sinks 440, storage 430, and sources 410 allow each of these components to be described by the mapping from decision variables to resources consume and resources produced. Resources and other components of system 400 do not need to be "typed," but rather can be defined generally. The mapping from decision variables to resource consumption and production can change based on extrinsic conditions. Asset allocator 420 can solve the optimization problem by simply balancing resource use and can be configured to solve in terms of consumed resource 1, consumed resource 2, produced resource 1, etc., rather than electricity consumed, water consumed, and chilled water produced. Such an interface at the high level allows for the mappings to be injected into asset allocation system 400 rather than needing them hard coded. Of course, "typed" resources and other components of system 400 can still exist in order to generate the mapping at run time, based on equipment out of service.

Incorporating multiple subplants 420 or sinks 440 of the same type allows for modeling the interconnections between subplants 420, sources 410, storage 430, and sinks 440. This type of modeling describes which subplants 420 can use resource from which sources 410 and which subplants 420 can send resources to which sinks 440. This can be visualized as a resource connection matrix (i.e., a directed graph) between the subplants 420, sources 410, sinks 440, and storage 430. Extending this concept, it is possible to include costs for delivering the resource along a connection and also, efficiencies of the transmission (e.g., amount of energy that makes it to the other side of the connection).

In some instances, constraints arise due to mechanical problems after an energy facility has been built. Accordingly, these constraints are site specific and are often not incorporated into the main code for any of subplants 420 or the high level problem itself. Commissioned constraints allow for such constraints to be added without software updates during the commissioning phase of the project. Furthermore, if these additional constraints are known prior to the plant build, they can be added to the design tool run. This would allow the user to determine the cost of making certain design decisions.

Incentive programs often require the reservation of one or more assets for a period of time. In traditional systems, these assets are typically turned over to alternative control, different than the typical resource price based optimization. Advantageously, asset allocator 402 can be configured to add revenue to the cost function per amount of resource reserved. Asset allocator 402 can then make the reserved portion of the resource unavailable for typical price based cost optimization. For example, asset allocator 402 can reserve a portion of a battery asset for frequency response. In this case, the battery can be used to move the load or shave the peak demand, but can also be reserved to participate in the frequency response program.

Central Plant Controller

Referring now to FIG. 5, a block diagram of a central plant controller 500 in which asset allocator 402 can be implemented is shown, according to an exemplary embodiment. In various embodiments, central plant controller 500 can be configured to monitor and control central plant 200, asset allocation system 400, and various components thereof (e.g., sources 410, subplants 420, storage 430, sinks 440, etc.). Central plant controller 500 is shown providing control decisions to a building management system (BMS) 506. The control decisions provided to BMS 506 may include resource purchase amounts for sources 410, setpoints for subplants 420, and/or charge/discharge rates for storage 430. In other embodiments, the central plant controller is configured in a planning tool implementation in which an operation of the central plant is planned over an optimization period (e.g., 1 year) for use in planning, operational decision-making, budgeting, planning for purchase of new assets, etc.

In some embodiments, BMS 506 is the same or similar to the BMS described with reference to FIG. 1. BMS 506 may be configured to monitor conditions within a controlled building or building zone. For example, BMS 506 may receive input from various sensors (e.g., temperature sensors, humidity sensors, airflow sensors, voltage sensors, etc.) distributed throughout the building and may report building conditions to central plant controller 500. Building conditions may include, for example, a temperature of the building or a zone of the building, a power consumption (e.g., electric load) of the building, a state of one or more actuators configured to affect a controlled state within the building, or other types of information relating to the controlled building. BMS 506 may operate subplants 420 and storage 430 to affect the monitored conditions within the building and to serve the thermal energy loads of the building.

BMS 506 may receive control signals from central plant controller 500 specifying on/off states, charge/discharge rates, and/or setpoints for the subplant equipment. BMS 506 may control the equipment (e.g., via actuators, power relays, etc.) in accordance with the control signals provided by central plant controller 500. For example, BMS 506 may operate the equipment using closed loop control to achieve the setpoints specified by central plant controller 500. In various embodiments, BMS 506 may be combined with central plant controller 500 or may be part of a separate building management system. According to an exemplary embodiment, BMS 506 is a METASYS® brand building management system, as sold by Johnson Controls, Inc.

Central plant controller 500 may monitor the status of the controlled building using information received from BMS 506. Central plant controller 500 may be configured to predict the thermal energy loads (e.g., heating loads, cooling loads, etc.) of the building for plurality of time steps in an optimization period (e.g., using weather forecasts from a weather service 504). Central plant controller 500 may also predict the revenue generation potential of incentive based demand response (IBDR) programs using an incentive event history (e.g., past clearing prices, mileage ratios, event probabilities, etc.) from incentive programs 502. Central plant controller 500 may generate control decisions that optimize the economic value of operating central plant 200 over the duration of the optimization period subject to constraints on the optimization process (e.g., energy balance constraints, load satisfaction constraints, etc.). The optimization process performed by central plant controller 500 is described in greater detail below.

In some embodiments, central plant controller 500 is integrated within a single computer (e.g., one server, one housing, etc.). In various other exemplary embodiments, central plant controller 500 can be distributed across multiple servers or computers (e.g., that can exist in distributed locations). In another exemplary embodiment, central plant controller 500 may integrated with a smart building manager that manages multiple building systems and/or combined with BMS 506.

Central plant controller 500 is shown to include a communications interface 536 and a processing circuit 507. Communications interface 536 may include wired or wireless interfaces (e.g., jacks, antennas, transmitters, receivers, transceivers, wire terminals, etc.) for conducting data communications with various systems, devices, or networks. For example, communications interface 536 may include an Ethernet card and port for sending and receiving data via an Ethernet-based communications network and/or a WiFi transceiver for communicating via a wireless communications network. Communications interface 536 may be configured to communicate via local area networks or wide area networks (e.g., the Internet, a building WAN, etc.) and may use a variety of communications protocols (e.g., BACnet, IP, LON, etc.).

Communications interface 536 may be a network interface configured to facilitate electronic data communications between central plant controller 500 and various external systems or devices (e.g., BMS 506, subplants 420, storage 430, sources 410, etc.). For example, central plant controller 500 may receive information from BMS 506 indicating one or more measured states of the controlled building (e.g., temperature, humidity, electric loads, etc.) and one or more states of subplants 420 and/or storage 430 (e.g., equipment status, power consumption, equipment availability, etc.). Communications interface 536 may receive inputs from BMS 506, subplants 420, and/or storage 430 and may provide operating parameters (e.g., on/off decisions, setpoints, etc.) to subplants 420 and storage 430 via BMS 506. The operating parameters may cause subplants 420 and storage 430 to activate, deactivate, or adjust a setpoint for various devices thereof.

Still referring to FIG. 5, processing circuit 507 is shown to include a processor 508 and memory 510. Processor 508 may be a general purpose or specific purpose processor, an application specific integrated circuit (ASIC), one or more field programmable gate arrays (FPGAs), a group of processing components, or other suitable processing components. Processor 508 may be configured to execute computer code or instructions stored in memory 510 or received from other computer readable media (e.g., CDROM, network storage, a remote server, etc.).

Memory 510 may include one or more devices (e.g., memory units, memory devices, storage devices, etc.) for storing data and/or computer code for completing and/or facilitating the various processes described in the present disclosure. Memory 510 may include random access memory (RAM), read-only memory (ROM), hard drive storage, temporary storage, non-volatile memory, flash memory, optical memory, or any other suitable memory for storing software objects and/or computer instructions. Memory 510 may include database components, object code components, script components, or any other type of information structure for supporting the various activities and information structures described in the present disclosure. Memory 510 may be communicably connected to processor 508 via processing circuit 507 and may include computer code for executing (e.g., by processor 508) one or more processes described herein.

Memory 510 is shown to include a building status monitor 524. Central plant controller 500 may receive data regarding the overall building or building space to be heated or cooled by system 400 via building status monitor 524. In an exemplary embodiment, building status monitor 524 may include a graphical user interface component configured to provide graphical user interfaces to a user for selecting building requirements (e.g., overall temperature parameters, selecting schedules for the building, selecting different temperature levels for different building zones, etc.).

Central plant controller 500 may determine on/off configurations and operating setpoints to satisfy the building requirements received from building status monitor 524. In some embodiments, building status monitor 524 receives, collects, stores, and/or transmits cooling load requirements, building temperature setpoints, occupancy data, weather data, energy data, schedule data, and other building parameters. In some embodiments, building status monitor 524 stores data regarding energy costs, such as pricing information available from sources 410 (energy charge, demand charge, etc.).

Still referring to FIG. 5, memory 510 is shown to include a load/rate predictor 522. Load/rate predictor 522 may be configured to predict the thermal energy loads ($\hat{\ell}_k$) of the building or campus for each time step k (e.g., k=1 ... n) of an optimization period. Load/rate predictor 522 is shown receiving weather forecasts from a weather service 504. In some embodiments, load/rate predictor 522 predicts the thermal energy loads $\hat{\ell}_k$ as a function of the weather forecasts. In some embodiments, load/rate predictor 522 uses feedback from BMS 506 to predict loads $\hat{\ell}_k$. Feedback from BMS 506 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 522 receives a measured electric load and/or previous measured load data from BMS 506 (e.g., via building status monitor 524). Load/rate predictor 522 may predict loads $\hat{\ell}_k$ as a function of a given weather forecast ($\hat{\phi}_w$), a day type (day), the time of day (t), and previous measured load data ($Y_{k-1}$). Such a relationship is expressed in the following equation:

$$\hat{\ell}_k = f(\hat{\phi}_w, \text{day}, t | Y_{k-1})$$

In some embodiments, load/rate predictor 522 uses a deterministic plus stochastic model trained from historical load data to predict loads $\hat{\ell}_k$. Load/rate predictor 522 may use any of a variety of prediction methods to predict loads $\hat{\ell}_k$ (e.g., linear regression for the deterministic portion and an AR model for the stochastic portion). Load/rate predictor 522 may predict one or more different types of loads for the building or campus. For example, load/rate predictor 522 may predict a hot water load $\hat{\ell}_{Hot,k}$ and a cold water load $\hat{\ell}_{Cold,k}$ for each time step k within the prediction window. In some embodiments, load/rate predictor 522 makes load/rate predictions using the techniques described in U.S. patent application Ser. No. 14/717,593.

Load/rate predictor 522 is shown receiving utility rates from sources 410. Utility rates may indicate a cost or price per unit of a resource (e.g., electricity, natural gas, water, etc.) provided by sources 410 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from sources 410 or predicted utility rates estimated by load/rate predictor 522.

In some embodiments, the utility rates include demand charges for one or more resources provided by sources 410. A demand charge may define a separate cost imposed by sources 410 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 530 may be configured to account for demand charges in the high level optimization process performed by asset allocator 402. Sources 410 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 522 may store the predicted loads $\hat{\ell}_k$ and the utility rates in memory 510 and/or provide the predicted loads $\hat{\ell}_k$ and the utility rates to demand response optimizer 530.

Still referring to FIG. 5, memory 510 is shown to include an incentive estimator 520. Incentive estimator 520 may be configured to estimate the revenue generation potential of participating in various incentive-based demand response (IBDR) programs. In some embodiments, incentive estimator 520 receives an incentive event history from incentive programs 502. The incentive event history may include a history of past IBDR events from incentive programs 502. An IBDR event may include an invitation from incentive programs 502 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 520 may use the incentive event history to estimate IBDR event probabilities during the optimization period.

Incentive estimator 520 is shown providing incentive predictions to demand response optimizer 530. The incentive predictions may include the estimated IBDR probabilities, estimated participation requirements, an estimated amount of revenue from participating in the estimated IBDR events, and/or any other attributes of the predicted IBDR events. Demand response optimizer 530 may use the incentive predictions along with the predicted loads $\hat{\ell}_k$ and utility rates from load/rate predictor 522 to determine an optimal set of control decisions for each time step within the optimization period.

Still referring to FIG. 5, memory 510 is shown to include a demand response optimizer 530. Demand response optimizer 530 may perform a cascaded optimization process to optimize the performance of asset allocation system 400. For example, demand response optimizer 530 is shown to include asset allocator 402 and a low level optimizer 534. Asset allocator 402 may control an outer (e.g., subplant level) loop of the cascaded optimization. Asset allocator 402 may determine an optimal set of control decisions for each time step in the prediction window in order to optimize (e.g., maximize) the value of operating asset allocation system 400. Control decisions made by asset allocator 402 may include, for example, load setpoints for each of subplants 420, charge/discharge rates for each of storage 430, resource purchase amounts for each type of resource purchased from sources 410, and/or an amount of each resource sold to energy purchasers 504. In other words, the control decisions may define resource allocation at each time step. The control decisions made by asset allocator 402 are based on the statistical estimates of incentive event probabilities and revenue generation potential for various IBDR events as well as the load and rate predictions.

Low level optimizer 534 may control an inner (e.g., equipment level) loop of the cascaded optimization. Low level optimizer 534 may determine how to best run each subplant at the load setpoint determined by asset allocator 402. For example, low level optimizer 534 may determine on/off states and/or operating setpoints for various devices of the subplant equipment in order to optimize (e.g., minimize) the energy consumption of each subplant while meeting the resource allocation setpoint for the subplant. Such control decisions may be made by executing a control algorithm (e.g., low level optimization) subject to one or more constraints. Constraints may include, for example, maximum device capacities, energy or mass balance constraints, minimum device capacities, etc. For example, constraints on maximum device capacities (i.e., maximum production of each unit of equipment in a subplant) can prevent the low level optimizer 534 from allocating more load to a unit of equipment of a subplant than that unit can produce and thereby facilitate determination of appropriate on/off decisions for multiple devices of a subplant in order to meet the demand on that subplant determined by the asset allocator 402. Such constraints can be expressed as inequality constraints, where a target production for an equipment unit of a subplant is constrained to be less than a maximum production of that equipment unit. In some embodiments, such constraints are used to identify feasible on/off configurations which are then selected between to minimize an objective, for example as described in U.S. Pat. No. 10,101,731, filed Feb. 20, 2015. The maximum value used by such constraints can be dynamically adjusted, for example as described below with reference to FIGS. 6-15.

In some embodiments, low level optimizer 534 receives actual incentive events from incentive programs 502. Low level optimizer 534 may determine whether to participate in the incentive events based on the resource allocation set by asset allocator 402. For example, if insufficient resources have been allocated to a particular IBDR program by asset allocator 402 or if the allocated resources have already been used, low level optimizer 534 may determine that asset allocation system 400 will not participate in the IBDR program and may ignore the IBDR event. However, if the required resources have been allocated to the IBDR program and are available in storage 430, low level optimizer 534 may determine that system 400 will participate in the IBDR program in response to the IBDR event. The cascaded optimization process performed by demand response optimizer 530 is described in greater detail in U.S. patent application Ser. No. 15/247,885.

In some embodiments, low level optimizer 534 generates and provides subplant curves to asset allocator 402. Each subplant curve may indicate an amount of resource consumption by a particular subplant (e.g., electricity use measured in kW, water use measured in L/s, etc.) as a function of the subplant load. In some embodiments, low level optimizer 534 generates the subplant curves by running the low level optimization process for various combinations of subplant loads and weather conditions to generate multiple data points. Low level optimizer 534 may fit a curve to the data points to generate the subplant curves. In other embodiments, low level optimizer 534 provides the data points asset allocator 402 and asset allocator 402 generates the subplant curves using the data points. Asset allocator 402 may store the subplant curves in memory for use in the high level (i.e., asset allocation) optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 518. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

In some embodiments, low level optimizer 634 generates the subplant curves by running the low level optimization process for various combinations of subplant loads and weather conditions to generate multiple data points. Low level optimizer 634 may fit a curve to the data points to generate the subplant curves. In other embodiments, low level optimizer 634 provides the data points to asset allocator 402 and asset allocator 402 generates the subplant curves using the data points. Asset allocator 402 may store the subplant curves for use in the high level optimization process.

The asset allocator 402 may be configured to convert the subplant curves into convex curves, including automatically into multiple convex curves as described below with reference to FIG. 6. A convex curve is a curve for which a line connecting any two points on the curve is always above or along the curve (i.e., not below the curve). Convex curves may be advantageous for use in the high level optimization by the asset allocator 402 because they allow for an optimization process that is less computationally expensive relative to an optimization process that uses non-convex functions. The subplant curves may be defined by piecewise linear segments that combine to form a piecewise-defined convex curve. The subplant curves may thus be made of multiple linearized convex portions which reduce computational complexity relative to other possible implementations.

The asset allocator 402 can updated the high level optimization problem to incorporate the subplant curves into the optimization. For example, the decision variables can include one or more decision vectors representing the resource consumption of each subplant and inequality constraints can be modified using the subplant curves to ensure that the proper amount of each resource is consumed to serve the predicted thermal energy loads. In some embodiments, the asset allocator 402 formulates inequality constraints that force the resource usage for each resource in the epigraph of the corresponding linearized subplant curve. For example, chiller subplant 422 may have a linearized subplant curve that indicates the electricity use of chiller subplant 422 (i.e., input resource $in_1$) as a function of the cold water production of chiller subplant 422 (i.e., output resource $out_1$). The linearized subplant curve may include a first line segment connecting point $[u_1, Q_1]$ to point $[u_2, Q_2]$, a second line segment connecting point $[u_2, Q_2]$ to point $[u_3, Q_3]$, and a third line segment connecting point $[u_3, Q_3]$ to point $[u_4, Q_4]$.

The asset allocator 402 may formulate an inequality constraint for each piecewise segment of the subplant curve that constrains the value of the decision variable representing chiller electricity use to be greater than or equal to the amount of electricity use defined by the line segment for the corresponding value of the cold water production. Similar inequality constraints can be formulated for other subplant curves. For example, the asset allocator 402 may generate a set of inequality constraints for the water consumption of chiller subplant 422 using the points defining the linearized subplant curve for the water consumption of chiller subplant 422 as a function of cold water production. In some embodiments, the water consumption of chiller subplant 422 is equal to the cold water production and the linearized subplant curve for water consumption includes a single line segment connecting point $[u_5, Q_5]$ to point $[u_6, Q_6]$. The asset allocator 402 may repeat this process for each subplant curve for chiller subplant 522 and for the other subplants of the central plant to define a set of inequality constraints for each subplant curve.

Such inequality constraints ensure that asset keeps the resource consumption above all of the line segments of the corresponding subplant curve. In most situations, there is no reason for asset allocator 402 to choose a resource consumption value that lies above the corresponding subplant curve due to the economic cost associated with resource consumption. Asset allocator 402 can therefore be expected to select resource consumption values that lie on the corresponding subplant curve rather than above it.

The exception to this general rule is heat recovery chiller subplant 423. The equality constraints for heat recovery chiller subplant 423 provide that heat recovery chiller subplant 423 produces hot water at a rate equal to the subplant's cold water production plus the subplant's electricity use. The inequality constraints for heat recovery chiller subplant 423 allow asset allocator 402 to overuse electricity to make more hot water without increasing the amount of cold water production. This behavior is extremely inefficient and only becomes a realistic possibility when the demand for hot water is high and cannot be met using more efficient techniques. However, this is not how heat recovery chiller subplant 423 actually operates.

To prevent asset allocator 402 from overusing electricity, asset allocator 402 may check whether the calculated amount of electricity use (determined by the optimization algorithm) for heat recovery chiller subplant 423 is above the corresponding subplant curve. In some embodiments, the check is performed after each iteration of the optimization algorithm. If the calculated amount of electricity use for heat recovery chiller subplant 423 is above the subplant curve, a determining is made that the asset allocator 402 is overusing electricity. In response to a determination that asset allocator 402 is overusing electricity, the production of heat recovery chiller subplant 523 can be constrained at its current value and the electricity use of subplant 523 can be constrained to the corresponding value on the subplant curve. Asset allocator 402 may then rerun the optimization with the new equality constraints. These and other features of relating to subplant curves are described in greater detail in U.S. patent application Ser. No. 14/634,609 filed Feb. 27, 2015, the entire disclosure of which is incorporated by reference herein.

In some embodiments, the asset allocator 402 uses constraints on maximum production of each subplant and/or devices of equipment within each subplant that dynamically vary as functions of one or more dynamic variables. For example, the subplant curves may be provided to the asset allocator 402 along with dynamic maximum capacities of the subplants determined according to measured or predicted values of dynamic variables that affect subplant and/or device capacity (e.g., outside air temperature, water temperatures flowing into, out of, or within equipment, etc.). The asset allocator 402 is then able to make control decisions (load allocations, etc.) subject to such dynamic constraints on maximum production.

Still referring to FIG. 5, memory 510 is shown to include a subplant control module 528. Subplant control module 528 may store historical data regarding past operating statuses, past operating setpoints, and instructions for calculating and/or implementing control parameters for subplants 420 and storage 430. Subplant control module 528 may also receive, store, and/or transmit data regarding the conditions of individual devices of the subplant equipment, such as operating efficiency, equipment degradation, a date since last service, a lifespan parameter, a condition grade, or other device-specific data. Subplant control module 528 may receive data from subplants 420, storage 430, and/or BMS 506 via communications interface 536. Subplant control module 528 may also receive and store on/off statuses and operating setpoints from low level optimizer 534.

Data and processing results from demand response optimizer 530, subplant control module 528, or other modules of central plant controller 500 may be accessed by (or pushed to) monitoring and reporting applications 526. Monitoring and reporting applications 526 may be configured to generate real time "system health" dashboards that can be viewed and navigated by a user (e.g., a system engineer). For example, monitoring and reporting applications 526 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 5, central plant controller 500 may include one or more GUI servers, web services 512, or GUI engines 514 to support monitoring and reporting applications 526. In various embodiments, applications 526, web services 512, and GUI engine 514 may be provided as separate components outside of central plant controller 500 (e.g., as part of a smart building manager). Central plant controller 500 may be configured to maintain detailed historical databases (e.g., relational databases, XML, databases, etc.) of relevant data and includes computer code modules that continuously, frequently, or infrequently query, aggregate, transform, search, or otherwise process the data maintained in the detailed databases. Central plant controller 500 may be configured to provide the results of any such processing to other databases, tables, XML files, or other data structures for further querying, calculation, or access by, for example, external monitoring and reporting applications.

Central plant controller 500 is shown to include configuration tools 516. Configuration tools 516 can allow a user to define (e.g., via graphical user interfaces, via prompt-driven "wizards," etc.) how central plant controller 500 should react to changing conditions in the energy storage subsystems. In an exemplary embodiment, configuration tools 516 allow a user to build and store condition-response scenarios that can cross multiple energy storage system devices, multiple building systems, and multiple enterprise control applications (e.g., work order management system applications, entity resource planning applications, etc.). For example, configuration tools 516 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 516 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Various other implementations of the cost functions, optimization processes, controllers, etc. described above are also possible. For example, the systems and methods described herein may be implemented with any combination of the various features described in U.S. patent application Ser. No. 15/405,236, filed Jan. 12, 2017; U.S. patent application Ser. No. 15/405,234, filed Jan. 12, 2017; U.S. patent application Ser. No. 15/429,962, filed Feb. 7, 2017; U.S. patent application Ser. No. 15/473,496, filed Mar. 29, 2017; U.S. patent application Ser. No. 15/616,616, filed Jun. 7, 2017; U.S. patent application Ser. No. 16/115,290, filed Aug. 28, 2018; U.S. patent application Ser. No. 16/260,030, filed Jan. 27, 2019; U.S. patent application Ser. No. 17/668,791, filed Feb. 10, 2022; U.S. Pat. No. 11,221,156, granted Jan. 11, 2022; U.S. Pat. No. 9,612,601, granted Apr. 4, 2017; and U.S. Pat. No. 9,612,601, granted Apr. 4, 2017. These applications are incorporated by reference herein in their entireties.

Dynamic Capacity Constraint Adjustment

Referring generally to FIGS. 6-19, approaches for accounting for dynamic changes to maximum production capacities of equipment such as chillers are shown and described. The examples in the discussion below focus on chillers, but can also be adapted for other types of equipment (e.g., boilers, heaters, air handling units, variable refrigerant flow units, generators, etc.) and all such adaptations are within the scope of the present disclosure. Additionally, although the examples in the discussion below focus on adjusting the maximum capacity of equipment, the same or similar techniques can be used to adjust the minimum capacity of the equipment or the capacity of the equipment at any point between the minimum and the maximum (e.g., 20% capacity, 50% capacity, 80% capacity, etc.). For example, proportional adjustments can be made to any other capacity of the equipment based on the ratio between the original (e.g., design) maximum capacity and the adjusted maximum capacity of the equipment. This ratio may define a scaling factor which can be applied to any other capacity of the equipment between the minimum and the maximum. In some embodiments, the entire resource production vs. resource consumption curve for the equipment (examples shown in FIGS. 17 and 19) can be proportionally adjusted or scaled based on the scaling factor applied to the maximum capacity.

The maximum production (capacity) of various equipment is often provided as a single design value by manufacturers, but typically will vary as a function of dynamic conditions in variables both internal and external to such equipment. For example, outside air temperature can affect the operation of a refrigeration cycle or associated device (e.g., chiller, rooftop unit, cooling tower, etc.) by changing the temperature differential across which heat is to be transferred from such a device to outside air. Internal variables such as temperatures of water (or other working fluid) flowing into, within, or out of such devices or components thereof can also affect maximum production of each device. In a central plant with various interconnections (e.g., as in FIG. 4), operation of each subplant can influence the maximum capacities of other subplants.

In some scenarios, actual maximum production of a device will be less than the design capacity of that device. In such a scenario, if a controller requests the device to operate at the design capacity of the device, the device will fail to achieve the requested production. Accordingly, errors in control and failure to meet demands may occur. Advantageously, the teachings shown in FIGS. 6-19 and described below enable dynamic updates to constraints on production of devices of equipment based on one or more dynamic variables. Such constraints can then be used by control algorithms (e.g., by asset allocator 402 and/or low level optimizer 534) in making control decisions for control of such equipment.

In the example of a chiller, the maximum cooling capacity of a chiller (i.e., the maximum possible production of chilled water by that chiller) can vary as a function of lift, with lift being the pressure difference or temperature difference between the evaporator and the condenser. The effects of lift on load can be modelled based on the chilled water temperature outlet (CHWTOut) from the evaporator and the condenser water temperature outlet (CWTOut) from the condenser, as described in more detail below. The effects may also be modeled as functions of outside air temperature or other environmental or time-varying conditions (e.g., outside air wet bulb temperature).

In high lift conditions, chillers cooling capacity decreases. Thus, a chiller in high lift conditions will have a reduced maximum cooling capacity even when the compressor motor is operating at maximum power. A control approach that assumes a static maximum cooling capacity may thus lead to infeasible solutions at high lift conditions. For example, if a site has three identical chillers with a design cooling capacity of 3000 kW and a campus requires 5000 kW, then the central plant controller 500 may decide to run two chillers to satisfy the demand. However, if the maximum capacity of each chiller is actually reduced to 2000 kW due to high lift conditions, then those two chillers will not be able to meet the demand and the insufficient cooling will be provided. The teachings described here and below enable dynamic updates to constraints on maximum production (e.g., cooling capacity) so that the central plant controller 500 in this example is caused to set all three chillers as "on" in order to meet the demand. A wide variety of other scenarios benefit similarly from the teachings herein. Optimization and equipment allocation steps can be performed with dynamically-computed maximum capacities in order to ensure feasible solutions and otherwise improve plant operations.

Figure 6:
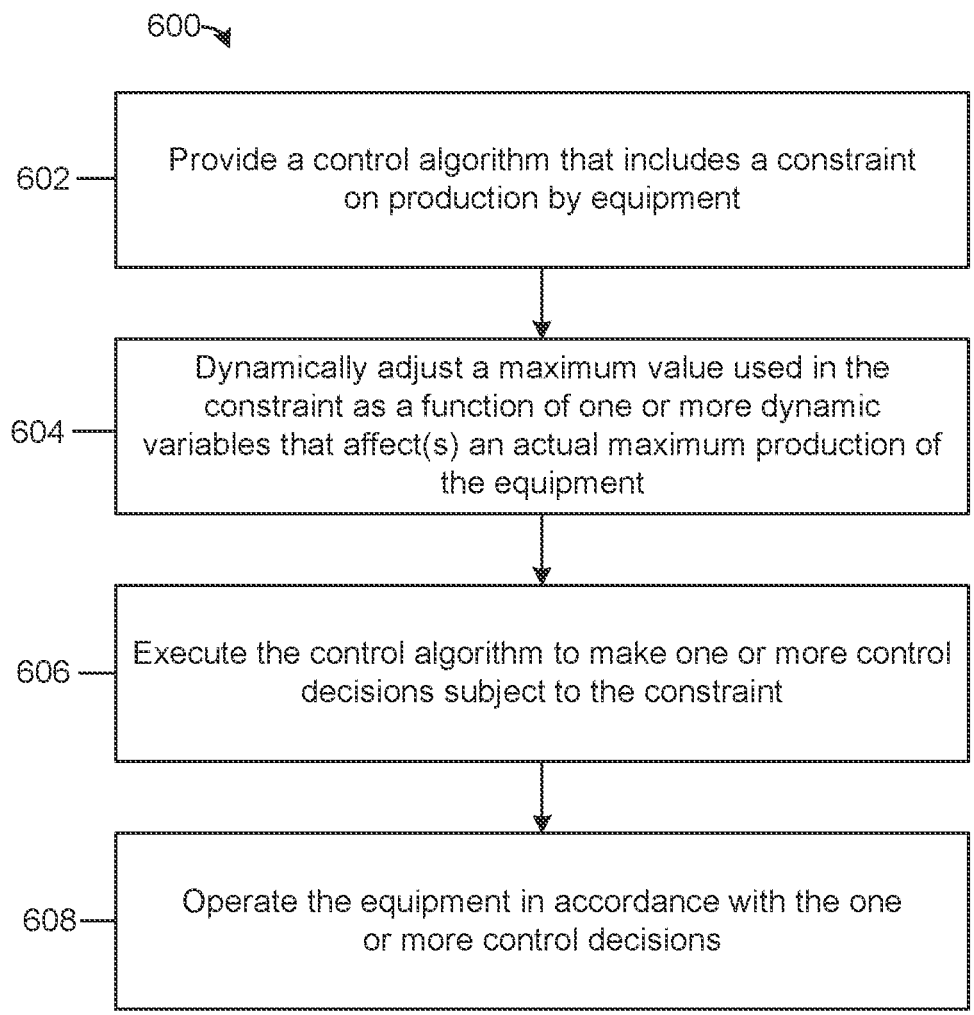
FIG. 6 is a flowchart of a process for controlling equipment in accordance with a dynamically adjusted constraint on equipment production, according to some embodiments.

Referring now to FIG. 6, a flowchart of a process 600 for controlling equipment based on a dynamic constraint on maximum production of the equipment is shown, according to some embodiments. Process 600 of FIG. 6 can be executed by the central plant controller 500 in various embodiments, for example by the low level optimizer 534, the asset allocator 402 and/or some combination thereof, or by some other controller, circuitry, computing system, etc. local to or remote from equipment in various embodiments.

At step 602, a control algorithm is provided that includes a constraint on production by equipment. The control algorithm may provide a high-level central plant optimization as solved by the asset allocator 402 as described above, a low level optimization as solved by the low level optimizer 534 as described above, or a combination thereof as provided by the central plant controller 500, for example. The control algorithm may include a predictive control process, for example a model predictive control algorithm in which an objective function is minimized to determine control outputs that optimize some objective, for example utility costs, occupant comfort, emissions, pollution, etc. or some combination thereof, for example as described in U.S. patent application Ser. No. 17/686,320, filed Mar. 3, 2022, the entire disclosure of which is incorporated by reference herein. In some examples, the control algorithm makes control decisions which may be or include a target amount of production of the equipment (e.g., tons of chilled water to provide, kWh of cooling or heating energy to provide) or a target consumption of the equipment (e.g., electrical power consumption, natural gas consumption) for one or more future time steps.

The constraint may be provided as an inequality constraint which restricts the control algorithm from selecting control decisions that would request the equipment to produce more than its maximum possible production (more than its max capacity). For example, the constraint may be formulated as $Q_{i,target} \leq Q_{i,max}$ where $Q_{i,target}$ is a target amount of production of the equipment at time step i which can be a decision variable of the control algorithm and $Q_{i,max}$ is a maximum value for the production of the equipment for time step i which defines the constraint. As indicated by inclusion of the subscript i the maximum value $Q_{i,max}$ used in the constraint is time-varying as described in the following passages.

At step 604, the maximum value ($Q_{i,max}$) used in the constraint is dynamically adjusted as a function of one or more dynamic variables that affect(s) an actual maximum production of the equipment. The function can be defined and the maximum value adjusted following steps of process 700 shown in FIG. 7 and described below, for example. In some embodiments, a sensor may measure a value of the one or more dynamic variables and the measured value can be used to dynamically adjust constraint. In some embodiments, a value of the one or more dynamic variables is predicted (e.g., for one or more future time steps) and the predicted value(s) can be used to dynamically adjust the constraint, for example such that the maximum value for a future time step i is adjusted as a function of the value of the dynamic variable predicted to occur at time step i.

The dynamic variable may characterize a physical state or condition of the equipment, a substance (e.g., fluid) used by the equipment, or an environment around or affected by the equipment, for example including temperatures, pressures, humidities, flow rates, etc. in various embodiments. In an example where the equipment is a chiller, the dynamic variable(s) may be CWTOut and/or CHWTOut as described below with reference to FIGS. 13-15. In some examples, the dynamic variable is outside air temperature (e.g., wet bulb temperature). In some embodiments, the dynamic variable is determined by applying a mathematical operation to a measured or predicted value of a physical state or condition, for example adding or subtracting an offset or rescaling or normalizing the value.

The one or more dynamic variables may be independent of control decisions or other actions of the central plant controller 500 or other relevant controller (e.g., ambient outdoor air temperature). In other examples, the central plant controller 500 may be able to affect the one or more dynamic variables. As one such example, in an embodiment including a chiller and a cooling tower, the central plant controller 500 may be able to influence a condenser inlet temperature for the chiller by controlling the cooling tower, with the condenser inlet temperature or some other physically-dependent or linked condition being a dynamic variable used in step 604. In various such examples, the central plant controller 500 can be enabled via linked constraints to affect and manage the maximum capacity of a device while also dynamically adjusting a constraint based on the maximum capacity of that device.

Step 604 thereby results in an adjustment of the constraint by defining a maximum feasible value for the production of the equipment, for example a maximum rate or amount of chilled water production (e.g., units of tonnes of chilled water, units of tonnes per unit time, units of energy, units of kW or kWh, etc.) configured to track actual, time-varying maximum production capacity of the equipment as a result of the dependence on the dynamic variable(s).

At step 606, the control algorithm is executed subject to the constraint to make one or more control decisions. Step 606 can include performing an optimization subject to the constraint, for example finding control decisions that minimize a total value of an objective function without violating the constraint on maximum production and any other constraints that may be included. The one or more control decisions can include, in various embodiments, a target amount of production for the equipment, a load allocation to a subplant that includes the equipment, a target operating power for the equipment, on/off decision for the equipment and/or other units of a same plant and/or subplant as the equipment, and/or operating setpoint (e.g., temperature setpoint, pressure setpoint, compressor frequency, valve position, etc.), for example. For example, the control algorithm can include various operations attributed to the central plant controller 500 above, for example operations attributed to the asset allocator 402 and/or the low level optimizer 534.

At step 608, the equipment is operated in accordance with the one or more control decisions. For example, the equipment can be turned on, turned off, operated at determined operating parameters, controlled to a determined setpoint, etc. For example, step 608 can include operating a compressor of a chiller. As further examples, step 608 can include actuating a valve, running a fan, operating a boiler, etc. Equipment can thereby be operated to provide a requested amount of production, with process 600 ensuring that the equipment is capable of providing the requested amount of product in view of time-varying conditions.

Figure 7:
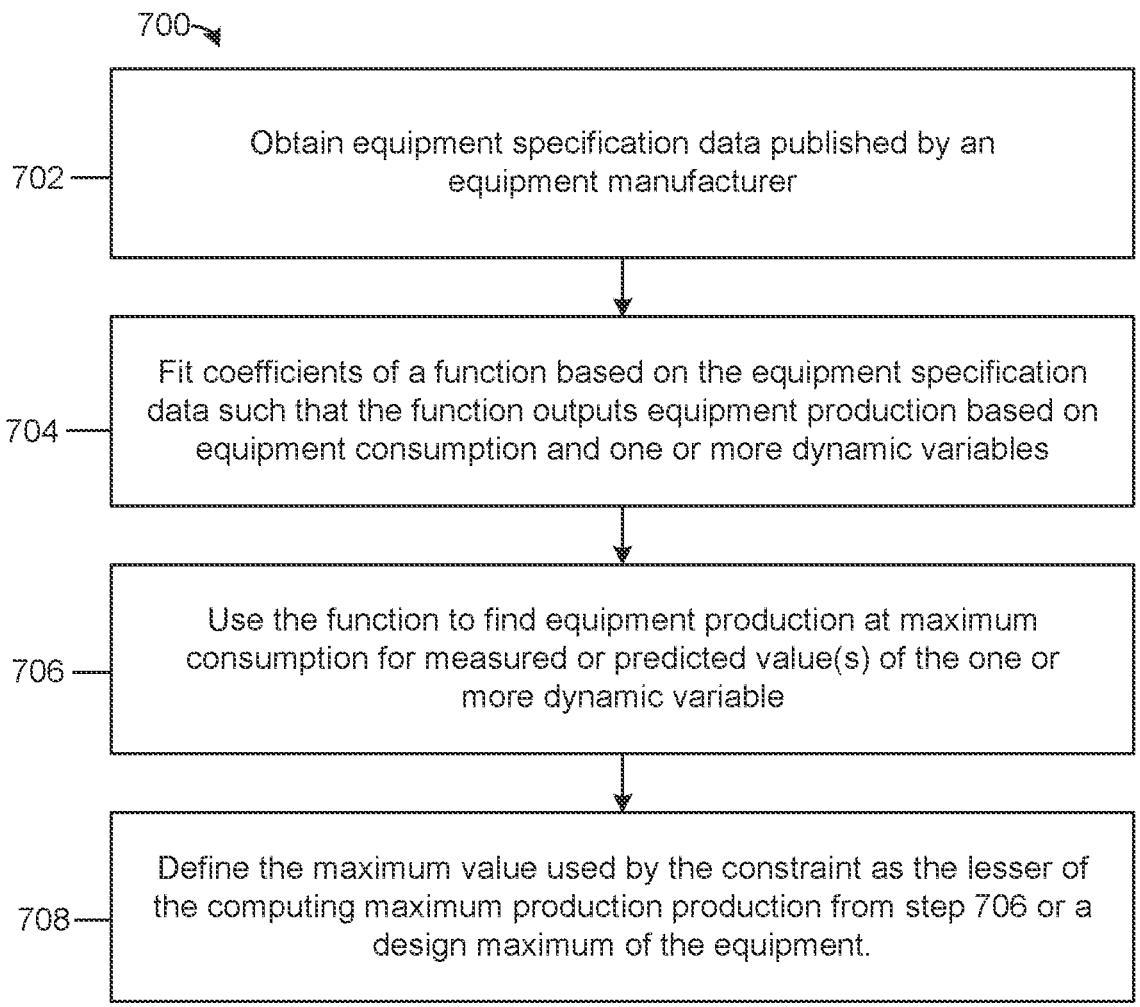
FIG. 7 is a flowchart of a process for defining values of the constraint of FIG. 6, according to some embodiments.

Referring now to FIG. 7, a flowchart of a process 700 for determining a function and using the function to define the maximum value used by a constraint in process 600 is shown, according to some embodiments. The process 700 can be performed by the central plant controller 500 in some embodiments, or by some other controller, circuitry, computing system, etc. local to or remote from equipment in various embodiments.

At step 702, equipment specification data published by an equipment manufacturing is obtained. The equipment specification data may be included in standard equipment information (user manuals, documentation, etc.) for the equipment. For example, an equipment manufacturer (or designer, distributor, retailer, etc. in various scenarios) may conduct testing on multiple units of a particular model of equipment (e.g., model number, model year, etc.) and may have knowledge of design requires for such equipment, such that the equipment manufacturer can provide documentation of typical or expected performance of a unit of building equipment. Step 702 can include automatically ingesting equipment specification data (e.g., from a digital database of such data, via image and/or natural language processing of documentation from manufacturers, etc.

An example of such documentation is shown in FIG. 8, according to some embodiments. FIG. 8 shows an equipment specification sheet 800 that includes various data for an equipment model, shown as for a chiller of a particular model number. The equipment specification sheet 800 provides expected capacity and power (production and consumption) performance in a load table 802 which can be expected to be achieved by the equipment unit given conditions shown in conditions table 804. As shown, the conditions table 804 includes entering fluid temp and leaving fluid temp data for the evaporator and condenser and a fluid pressure drop for the evaporator and condenser and can include conditions treated herein as dynamic variables. The load table 802 expresses the capacity (e.g., in tons) that can be provided at different powers under those conditions. The equipment specification sheet 800 is also shown as included a unit specifications table 806 showing additional specification information.

In some scenarios, a manufacturer may provide multiple equipment specification sheets 800 (or similar data or documentation) for a given equipment model with different condition data (i.e., different values in conditions table 804) which leads to different values in the load table 802 reflecting changes in performance resulting from changes in conditions. Often, multiple discrete such tables are provided. Accordingly, data on equipment performance under different conditions can be collected from a manufacturer in step 702.

At step 704, parameters of a function are fit based on the equipment specification data such that the function outputs equipment production based on equipment consumption and one or more dynamic variables. In examples where the equipment is a chiller, the function may capture the effects of lift and power consumption on chiller load, and may be based on the Gordon-Ng thermal model and/or the first and second laws of thermodynamics. For example, the function may be:

$$qEvap = \left(\frac{1}{2c_3}\right) * \left(-c_3 * \text{power} - \right.$$
$$(CWTOut - CHWTOut) \pm ((c_3 * \text{power} + (CWTOut - CHWTOut))^2 -$$
$$4c_3(c_1 * CWTOut * CHWTOUT +$$
$$\left. c_2 * (CWTOut - CHWTOut) - \text{power} * CHWTOut))^{0.5}\right)$$

where qEvap is chiller load (production), power is input power to the chiller (consumption), CHWTOut is chilled water temperature output (evaporator), CWTOut is condenser water temperature (outlet), and $c_1$, $c_2$, $c_3$ are model coefficients to be determined in step 704 in order to fit the function to the data from step 702. The function has two roots, with process 700 using the root within the minimum prediction error when compared to true data. Step 704 can include executing a linear regression using the function and the data from step 702 in order to determine values of the model coefficients ($c_1$, $c_2$, $c_3$). In this example, CHWTOut and CWTOut are the dynamic variables which capture changing physical conditions associated with the equipment.

Figure 9:
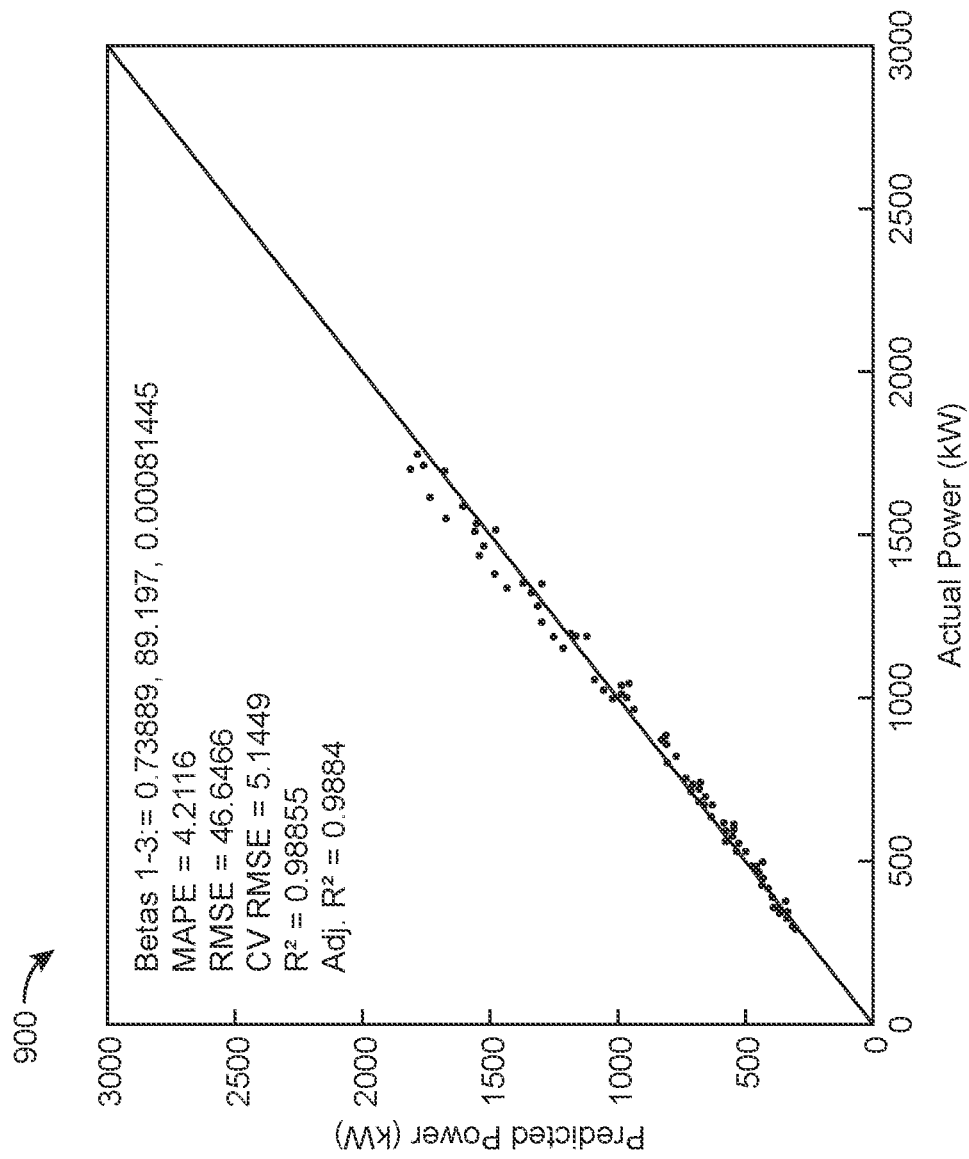
FIG. 9 is a first graphical representation of experimental results associated with the processes of FIG. 7, according to some embodiments.
Figure 10:
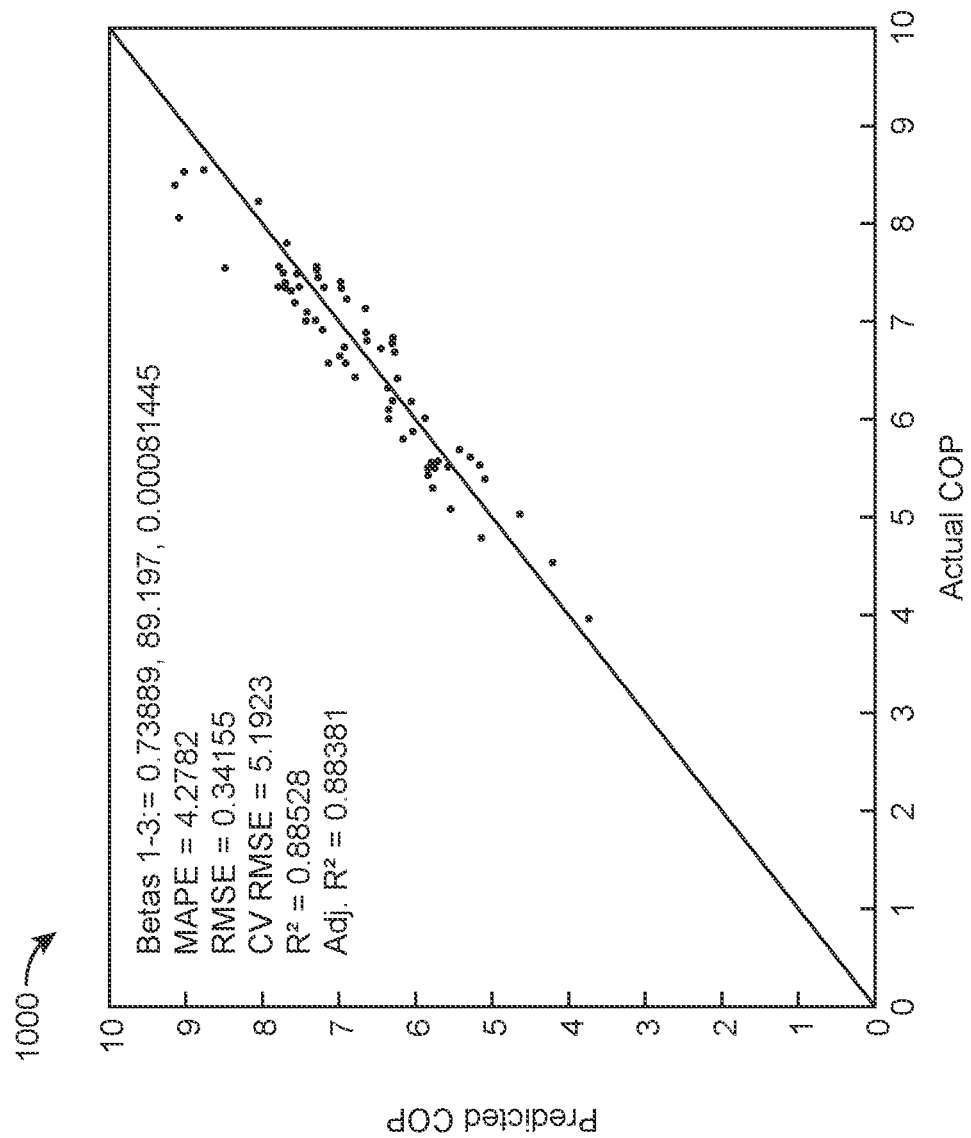
FIG. 10 is a second graphical representation of experimental results associated with the processes of FIG. 7, according to some embodiments.
Figure 11:
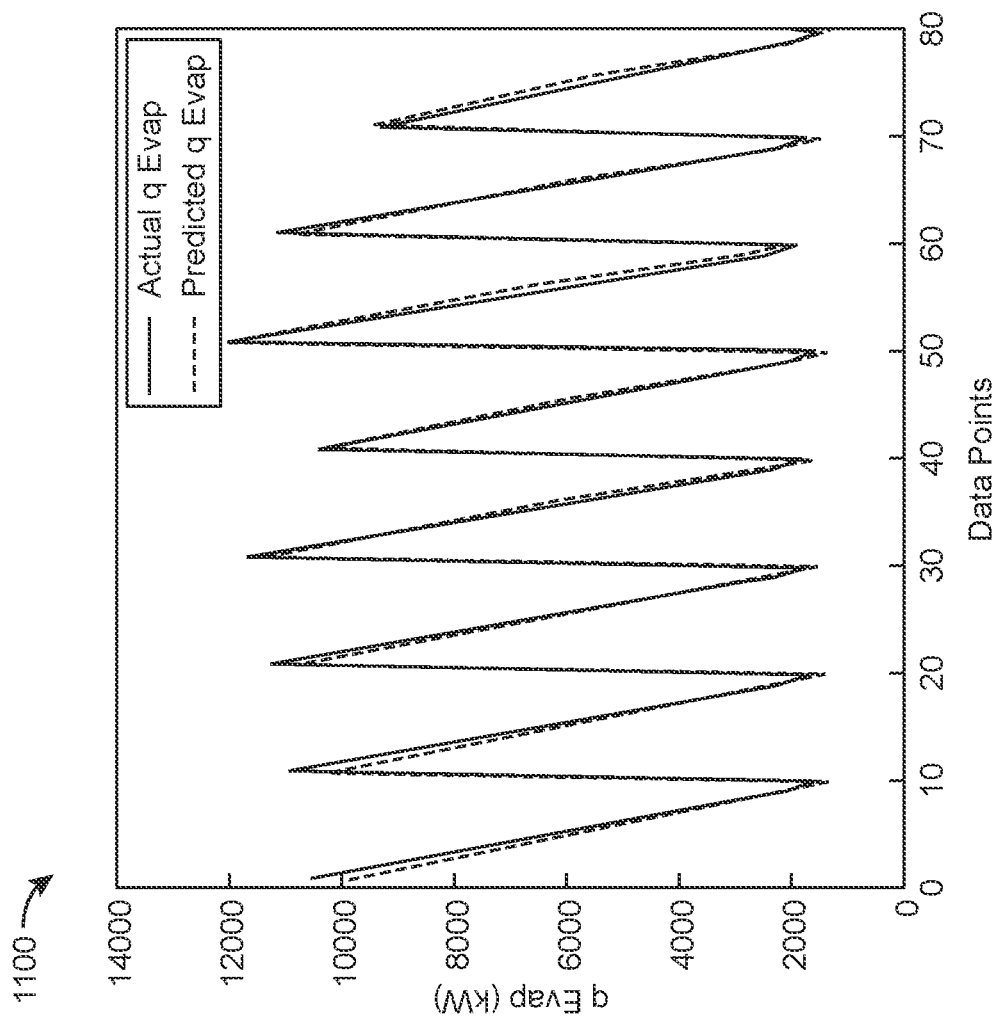
FIG. 11 is a third graphical representation of experimental results associated with the processes of FIG. 7, according to some embodiments.

In some embodiments, step 704 includes a validation step where the fit model is evaluated. An example scenario is illustrated in FIGS. 8-10 where graphical representations of model validation are shown given execution of steps 702 and 704 for example chiller data. FIG. 9 shows a graph 900 of actual power versus predicted power from the function above while FIG. 10 shows a graph 100 of actual coefficient of performance versus a predicted coefficient of performance obtained using the function above, all according to experimental data in a given embodiment. FIG. 11 shows a graph 1100 of predicted (i.e., using the function above) and actual qEvap (production) over time and under different conditions, according to experimental data in a given embodiment. FIGS. 9-11 illustrate that step 704 can provide a function that outputs a predicted production under variable conditions that accurately tracks actual equipment performance.

At step 706, the function is used to find equipment production at maximum consumption for measured or predicted value(s) of the one or more dynamic variables, e.g., values of CHWTOut and CWTOut. Step 706 includes plugging the measured or predicted values of the one or more dynamic variables and a known maximum consumption (e.g., maximum power of the equipment which may be a substantially static design limit available from manufacturer data collected in step 702) into the function output by step 704. Executing the mathematical operations provided in the function then results in a value for equipment production, i.e., qEvap in the example shown. Because that value is associated with the maximum consumption (power) and a set of relevant conditions (indicated by the one or more dynamic variables), the value of equipment production output from step 706 can be labelled and used as the maximum production given those conditions (i.e., those values of the one or more dynamic variables).

Figure 12:
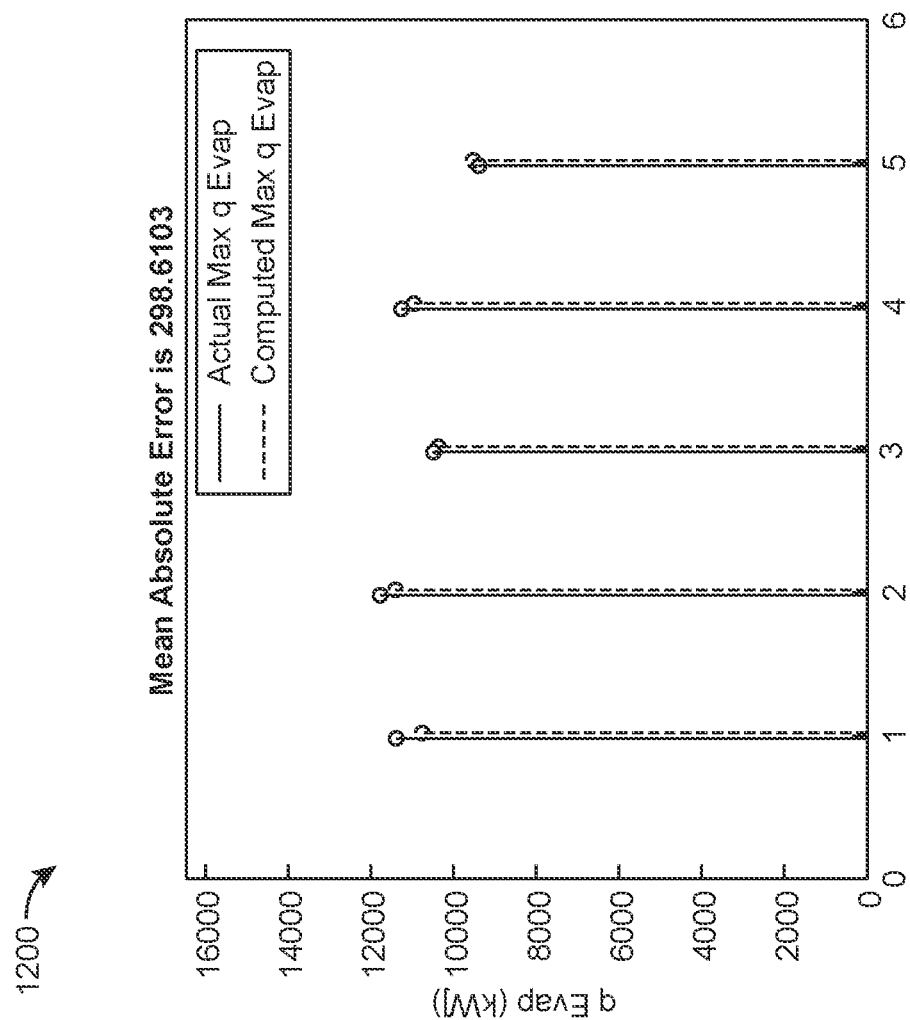
FIG. 12 is a fourth graphical representation of experimental results associated with the processes of FIG. 7, according to some embodiments.

FIG. 12 shows a graph 1200 of actual maximum production versus computed maximum production (i.e., from step 706) for five different conditions, according to experimental results in a given embodiment. FIG. 12 shows that the computed maximums accurately track changes in actual maximum production under different conditions. The processes herein may be adapted to provide any errors from actual maximum production as underestimates, such that resulting constraints are adapted to ensure feasible solutions.

In some embodiments, step 706 is executed online based on updates to the values of the dynamic variables over time, i.e., such that the function from step 704 is used online to adjust the maximum production value over time. For example, step 706 could include predicting a future value of a dynamic variable (e.g., using features described with reference to the load rate predictor 522) or receiving a predicted value from an external source (e.g., from weather service 504) for a future time step, and then calculating a maximum production for that future time step in step 706 using the predicted value of the dynamic variable. In other embodiments, step 706 includes sweeping a range of values of each of the one or more dynamic variables to pre-calculate maximum productions relating to different conditions (e.g., different combinations of values of the dynamic variables), for example for storage in a look-up table as pre-calculated values for online use.

Figure 13:
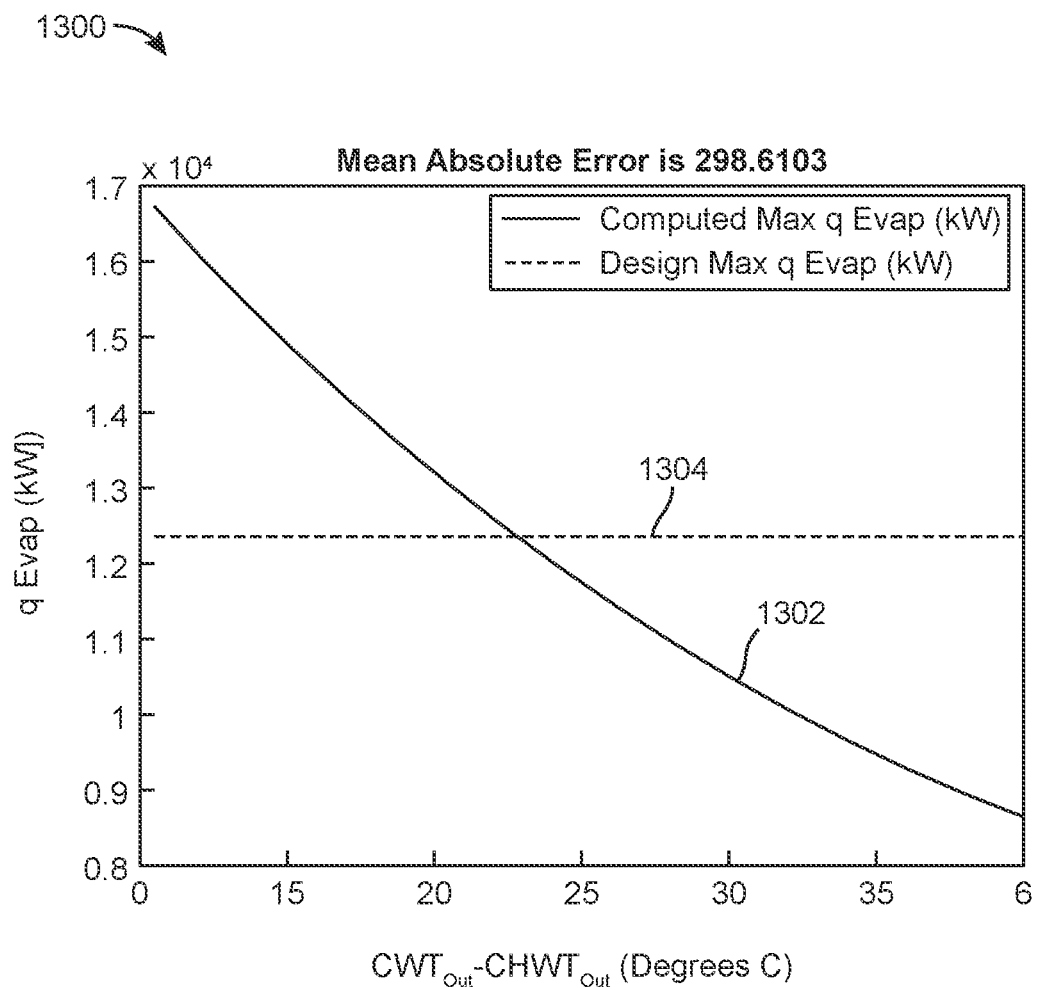
FIG. 13 is a fifth graphical representation of experimental results associated with the processes of FIG. 7, according to some embodiments.
Figure 14:
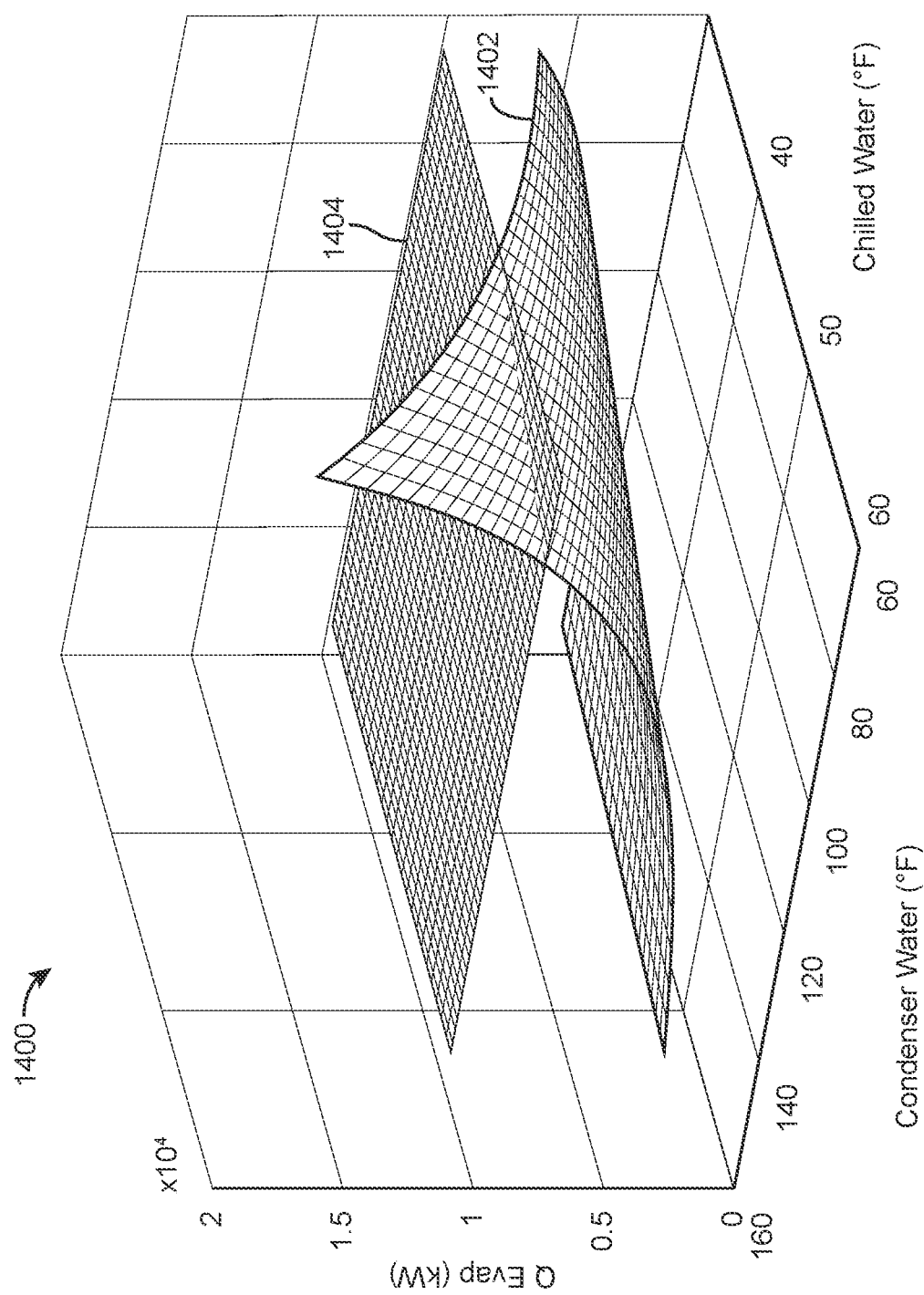
FIG. 14 is a sixth graphical representation of experimental results associated with the processes of FIG. 7, according to some embodiments.
Figure 15:
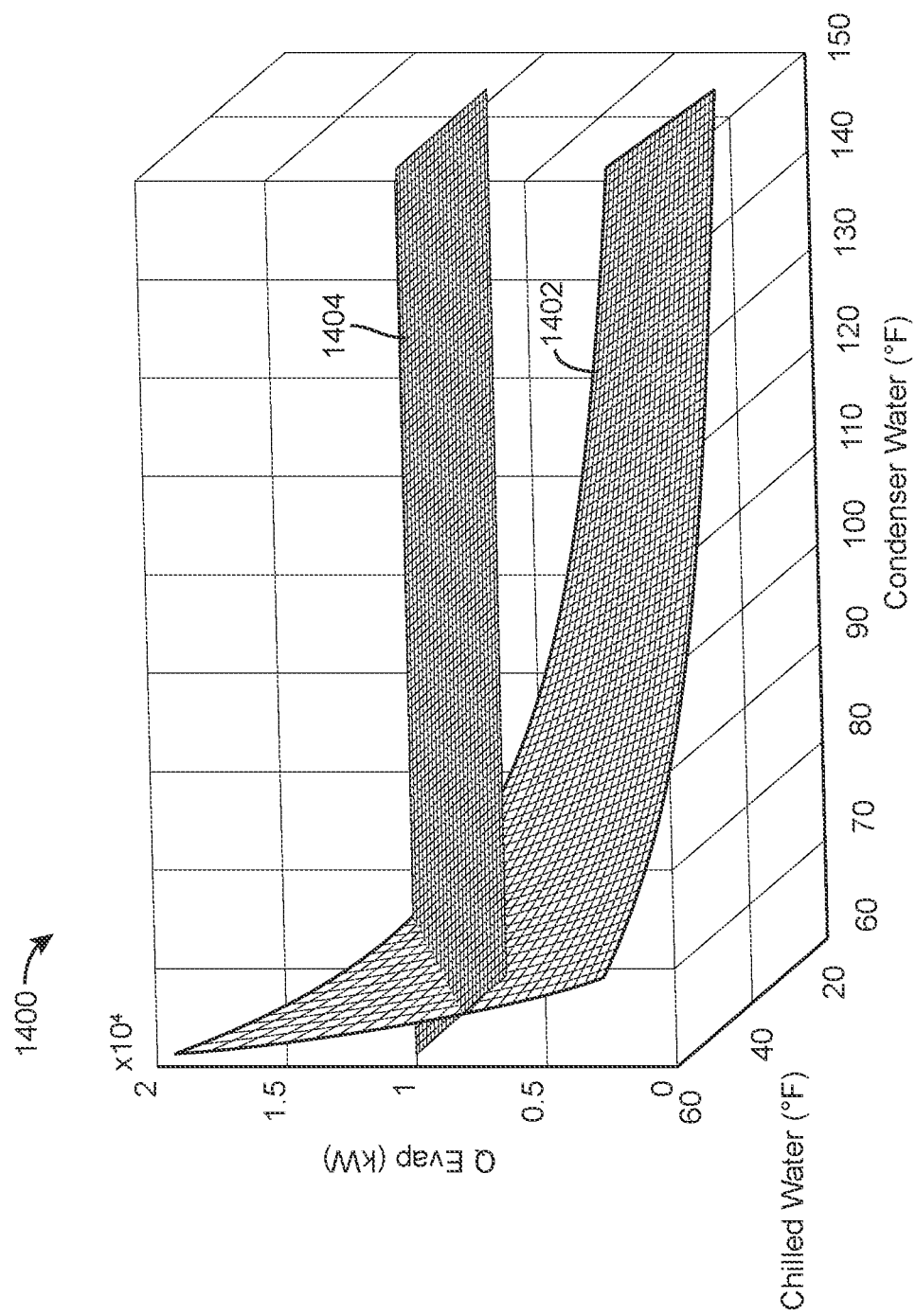
FIG. 15 is a seventh graphical representation of experimental results associated with the processes of FIG. 7, according to some embodiments.

FIGS. 13-15 provide graphical representations of the computed maximum production as a function of dynamic variables, according to experimental results in a given scenario and embodiment. FIG. 13 shows a graph 1300 with a first line 1302 representing computed maximum production as a function of CWTOut-CHWTOut and a second line 1304 showing the static design maximum listed by an equipment manager and which could be used to define a static constraint in other embodiments. As shown, the computed maximum production deviates from the static design maximum, including being lower than the design maximum at higher differences between CWTOut and CHWTOut and higher than the design maximum at lower differences between CWTOut and CHWTOut. FIGS. 14 and 15 show a graph 1400 from different perspectives that includes a first surface 1402 that plots computing maximum production as a function of both CWTOut (shown as "Condenser Water" in graph 1400) and CHWTOut (shown as "Chilled Water" in graph 1400) plotted on independent axes and a second surface 1404 showing the design maximum. The first surface 1402 and the second surface 1404 intersect, illustrating a region where the design maximum on surface 1404 is greater than the calculated maximum production on surface 1402 (i.e., the region in which the value of QEvap on surface 1404 exceeds the value of QEvap on surface 1402) and a second region where the design maximum on surface 1404 is less than the calculated maximum production on surface 1402 (i.e., the region in which the value of QEvap on surface 1404 is less than the value of QEvap on surface 1402). Because the calculated maximum production tracks actual changes in maximum production (as illustrated in the example of FIG. 12), the examples of FIGS. 13-15 illustrate that process 700 can capture significant deviations of actual maximum production from a static design value under a variety of conditions.

At step 708, the maximum value used by the constraint (i.e., in steps 605-608) is defined as the lesser of the computing maximum production from step 706 or the design maximum of the equipment (e.g., as plotted by the second line 1302 or the second surface 1402). Step 708 enables the constraint to capture reductions in production relative to design maximum without causing a control algorithm to demand more than the design maximum from the equipment. Although production greater than the design maximum may be achievable under certain conditions, selecting the design maximum when computing maximum production is greater than the design maximum ensures feasibility of control decisions and avoids pushing equipment beyond intended operating limits.

The maximum value selected in step 708 can be fed into process 600 where it is used to define a constraint on a control algorithm which is executed to control equipment. The equipment is thereby controlled in accordance with the maximum production value determined as a results of process 700. Process 700 can thereby substantially prevent a controller (e.g., central plant controller 500) from making infeasible control decisions.

Figure 16:
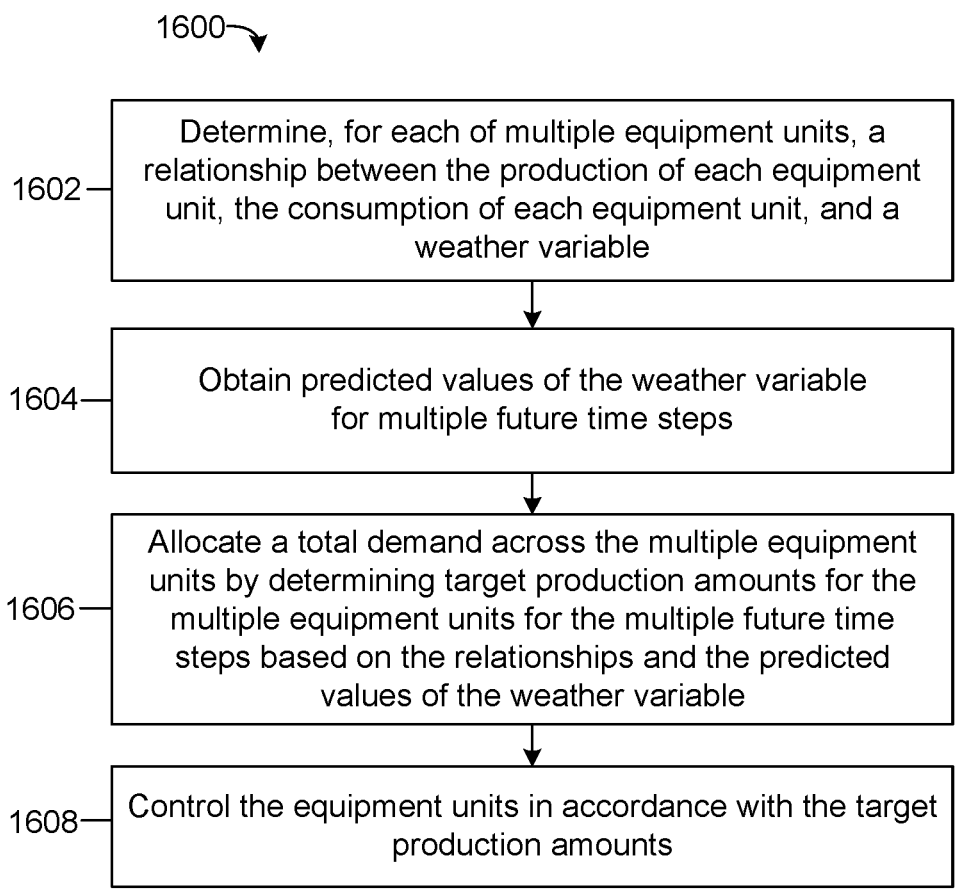
FIG. 16 is a flowchart of a process for allocating loads across equipment while accounting for effects of weather on capacity, according to some embodiments.

Referring now to FIG. 16, a flowchart of a process 1600 for allocating loads across equipment while accounting for effects of weather on capacity is shown, according to some embodiments. Process 1600 can be executed by the central plant controller 500 in various embodiments, for example by the low level optimizer 534, the asset allocator 402 and/or some combination thereof, or by some other controller, circuitry, computing system, etc. local to or remote from equipment in various embodiments.

Figure 17:
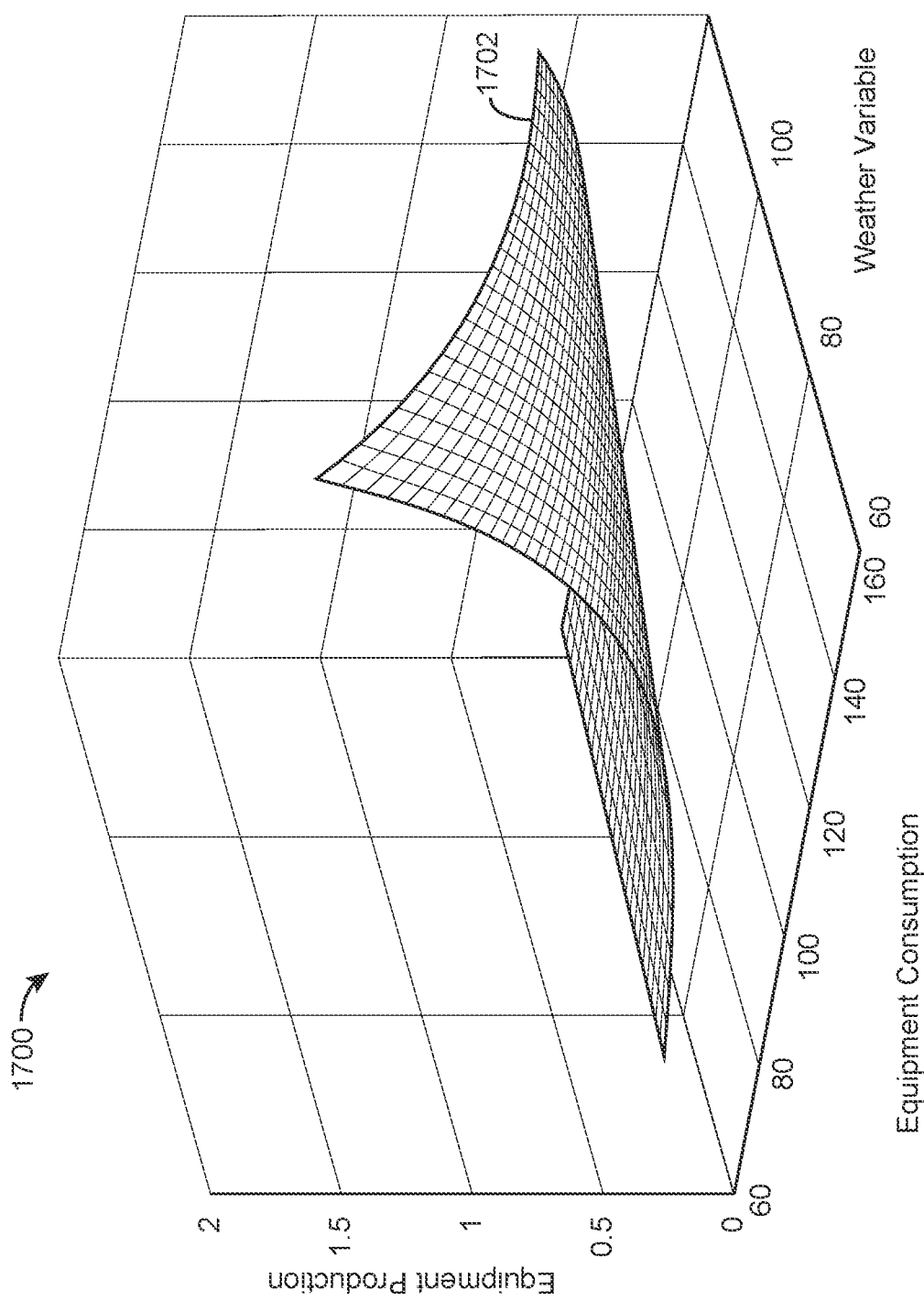
FIG. 17 is a graphical representation of a relationship between production, consumption, and a weather variable, according to some embodiment.

At step 1602, a relationship is determined, for each of multiple equipment units, between the production of each equipment unit, the consumption of each equipment unit, and a weather variable. The relationship can be determined from manufacturer specification data, experimental data, data collected from historical online operates of each particular equipment unit, data augmented by synthetic data generated by an artificial intelligence generator, and/or some other sources of data relating production, consumption, and the weather variable for the multiple equipment units. Determining the relationship can including identifying values of parameters of a function to fit a surface having dimensions of production, consumption, and the weather variable to such data. An example of such a curve is shown in FIG. 17 as curve 1702 on graph 1700, according to some embodiments. In some embodiments, the weather variable is outside air temperature (e.g., wet bulb temperature).

At step 1604, predicted values of the weather variable for multiple future time steps are obtained. Obtaining the predicted values of the weather variable can include receiving a weather forecast from weather service 504, in some embodiments. In some embodiments, obtaining the predicted values of the weather variable includes predicting the values of the weather variable (e.g., using deterministic and/or stochastic modeling as used for the load/rate predictor 522 for example) for a plurality of future time steps that occur during a future time period.

At step 1606, a total demand is allocated across the multiple equipment units by determining target production amounts for the multiple equipment units for the multiple future time steps based on the relationships from step 1602 and the predicted values of the weather variable from step 1604. For each equipment unit, target production amounts can be determined for the multiple future time steps. Step 1606 can coordinate operation of the multiple equipment units by accounting for the dependence of the efficiency (production vs. consumption) and/or maximum capacity (production at maximum consumption) of each equipment unit on the weather variable, including where such dependencies are different for the different equipment units. As one example, a first equipment unit may be more efficient than a second equipment unit under certain weather conditions and less efficient than the second equipment unit under other weather conditions, such that step 1606 may provide higher target productions amounts for the first equipment unit under certain weather conditions and higher target production amounts of the second equipment unit under other weather conditions. Step 1606 may also include time-shifting production of various equipment to exploit favorable weather conditions that may improve efficiency (e.g., at certain times of day relative to other times of day).

As one example, step 1606 can include executing operations attributed above to the asset allocator 402 using the relationships from step 1602 to define subplant curves dependent on the weather variable. Various constraints as explained above can be defined based on such subplant curves such that a high level optimization (e.g., minimization of an objective function) is performed subject to such constraints and dependent on values of the weather variable for future time steps (e.g., over an optimization horizon). In such embodiments, step 1606 includes using such weather dependent to determine asset allocations (e.g., target production amounts) to be used by low level optimizer 534 in making specific control decisions for equipment.

At step 1608, the equipment units are controlled in accordance with the target production amounts. Step 1608 may include determining control decisions (on off decisions, operating setpoints, etc.) based on the target production amounts and providing such control decisions to the equipment units to cause operation of the equipment units to approach and/or achieve the target production amounts. In some embodiments, one or more equipment units may be configured to directly control to a target production amount (e.g., using a feedback controller and real-time measurement of production). Step 1608 thereby provides physical, tangible adjustments to operation of equipment to consume and produce resources as a result of process 1600.

Figure 18:
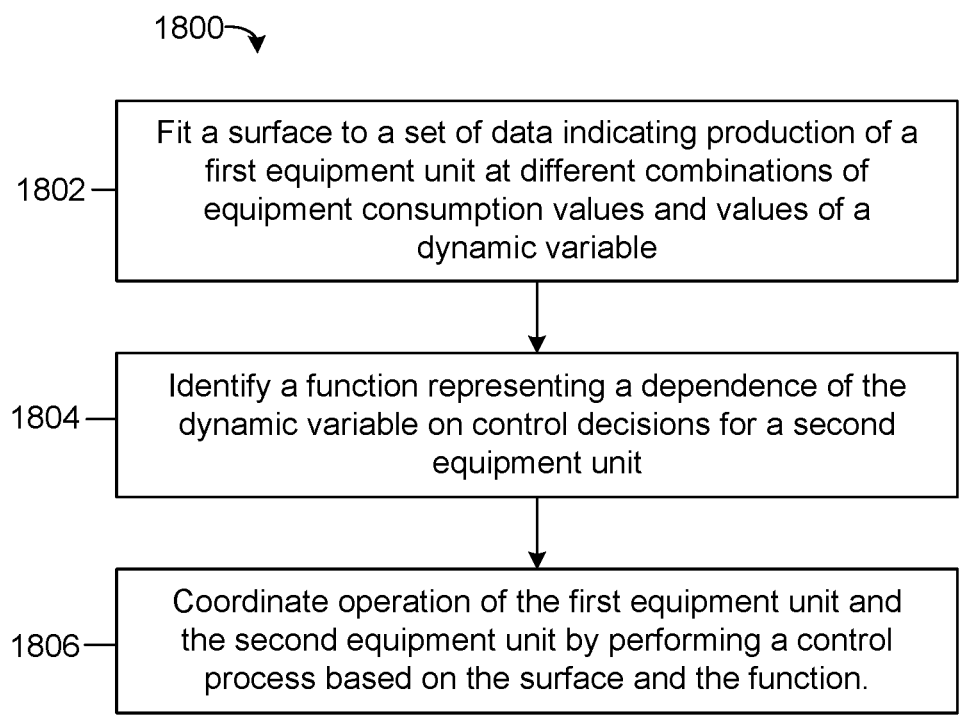
FIG. 18 is a flowchart of a process for coordinating operation of equipment units, according to some embodiments.

Referring now to FIG. 18, a flowchart of a process 1800 for coordinating operation of equipment units is shown, according to some embodiments. The process 1800 can be executed by the central plant controller 500 in various embodiments, for example by the low level optimizer 534, the asset allocator 402 and/or some combination thereof, or by some other controller, circuitry, computing system, etc. local to or remote from equipment in various embodiments At step 1802, a surface is fit to a set of data indicated production of a first equipment unit a different combinations of equipment consumption values and values of a dynamic variable. Step 1802 may be performed using manufacturer specification data, experimental data, data collected from historical online operates of each particular equipment unit, data augmented by synthetic data generated by an artificial intelligence generator, and/or any other source of data in various embodiments. Step 1802 can include performing a regression to identify values of parameters of a function to best fit a surface defined by the function to the available data. An example of such a surface is shown as surface 1902 in graph 1900 of FIG. 19, according to some embodiments.

In the examples contemplated by FIG. 18, the dynamic variable is dependent on operation of a second equipment unit. The second equipment unit is controllable to at least indirectly change the value of the dynamic variable. In some such embodiments, the first equipment unit is a chiller and the second equipment unit is a cooling tower, where the cooling tower operates to expel heat created by operation of the chiller. Operation of the cooling tower can thus affect a dynamic variable of the chiller, for example a condenser water temperature out (CWTOut) of the chiller, which can in turn affect lift of the chiller, maximum capacity of the chiller, and efficiency of the chiller as described in detail above. The cooling tower can be controllable (e.g., by changing a fan speed of the cooling tower) to controllably influence the value of a dynamic variable (e.g., CWTOut) on which efficiency is dependent as represented by the surface fit in step 1802. Various other examples in which equipment is interconnected, interdependent, etc. are in the scope of the present disclosure.

At step 1804, a function representing a dependence of the dynamic variable on control decisions for a second equipment unit is identified (fit, generated, obtained, etc.). Step 1804 can include using or generating various equipment models, first-principles models, artificial intelligence models, etc. As one example, a function modeling condenser water temperature for a chiller as a function of fan speed or other control variable of a cooling tower may be determined in step 1804. The function determined in step 1804 may also be dependent on various uncontrollable variables (e.g., weather variables such as outside temperature).

At step 1806, operation of the first equipment unit and the second equipment unit are coordinated by performing a control process based on both the surface and the function, i.e., based on relationships (1) between a control decision for the second equipment unit and the dynamic variable and (2) between the dynamic variable, production of the first equipment unit, and consumption of the first equipment unit. The control process may also account for consumption of the second equipment unit, for example such that power of the second equipment unit can be increased when such an increase is outweighed by the efficiency gains for the first equipment caused by an associated change in the dynamic variable resulting from the increased power of the second equipment unit. The control process of 1806 can include one or more optimizations of one or more objective functions subject to one or more constraints, for example linked constraints defined using the surface from step 1802 and the function from step 1804.

Step 1806 thereby causes the first equipment unit and the second equipment unit to operate in a coordinated manor that takes advantage of physical dependence of the efficiency and/or capacity of the first equipment unit on operation of the second equipment unit.

Dynamic Capacity Adjustment Use Cases

The ability to dynamically adjust the capacity of building equipment provides several advantages and can be used in a variety of different ways. Several examples of how the dynamic capacity adjustment can be used by central plant controller 500 in the context of an optimization-based control system for a central plant are described below. However, it should be understood that these use cases are not limiting and are merely provided as examples to illustrate a variety of use cases of the systems and methods of the present disclosure. It is contemplated that the dynamic capacity adjustment can be applied to any type of building equipment that operates within a capacity range and is not limited to equipment of a central plant.

Example Use Case #1: High Level Optimization

One use case of the dynamic capacity adjustment is to adjust the subplant curves or capacity constraints used by asset allocator 402 in the high level optimization process. As discussed above, the high level optimization process may include performing an optimization of an objective function to allocate heating loads, cooling loads, electric loads, or other types of loads across multiple subplants or groups of equipment over the duration of an optimization period. Each of the loads to be served by the equipment can be modeled as a type of resource to be produced by the equipment (e.g., hot water resource, cold water resource, electricity resource, etc.). The outputs of the high level optimization process may include amounts of each resource to be produced and consumed by each subplant or group of equipment at each time step of the optimization period. One input to the high level optimization process may include the required amount of each type of resource to be produced by the equipment at each time step of the optimization period. Another input to the high level optimization process may include the subplant curves or equipment models 518 that define the feasible operating ranges of the equipment and the relationships between the resource production and resource consumption of the equipment (e.g., the amount of each input resource required to produce a corresponding amount of an output resource). The operating ranges and relationships between resource production and resource consumption may be used to define constraints on the high level optimization process (e.g., maximum capacity constraints, subplant curve constraints, etc.) that are considered when performing the optimization of the objective function.

In some embodiments, the dynamic capacity adjustment can be used to modify the maximum capacity constraints considered by asset allocator 402 in the high level optimization process. For example, a maximum capacity constraint for a piece of equipment or group of equipment can be modified to replace the original maximum capacity value (e.g., a design value) within the constraint with a modified maximum capacity value generated using the techniques described above. In some embodiments, the maximum capacity value is adjusted as a function of lift (e.g., a difference between chilled water output temperature and condenser water output temperature of a chiller), which can be predicted for each time step of the optimization period. In some embodiments, the maximum capacity value is adjusted as a function of outside air temperature (e.g., outside air wet bulb temperature), which can be predicted for each time step of the optimization period.

In some embodiments, adjusting the maximum capacity value includes changing the maximum capacity value from a static variable (e.g., a single value for each time step of the optimization period) to a dynamic variable which can have different values at different time steps of the optimization period. For example, the maximum capacity of the equipment can be defined as a time series of capacity values including a value of the maximum capacity for each time step of the optimization period. The value of the maximum capacity at each time step can be modeled or defined as a function of other time-varying values such as the condenser water temperature, the chilled water temperature, the outside air temperature, or any other time-varying value which can be predicted for each time step of the optimization period. Accordingly, the dynamic capacity adjustment techniques described herein can be used to define the maximum capacity of the equipment as a time-varying value and define constraints on the high level optimization process that use different values of the maximum capacity at different time steps.

In some embodiments, the dynamic capacity adjustment can be used to modify the relationship between resource production and resource consumption of a piece of equipment or group of equipment (e.g., a subplant) considered by asset allocator 402 in the high level optimization process. For example, a subplant curve for a chiller subplant can be proportionally adjusted or scaled based on a scaling factor (e.g., the ratio between the original maximum capacity of the chiller subplant and the modified maximum capacity of the chiller subplant). Each point on the subplant curve can be proportionally adjusted by applying the scaling factor to generate a new (scaled) subplant curve. The new subplant curve can be used by asset allocator 402 when performing the high level optimization process. Similarly, a device-specific curve for an individual chiller or other type of building equipment (e.g., an equipment model 518 for the device) can be adjusted in the same manner to adjust the relationship between resource production and resource consumption for the device.

In some embodiments, adjusting the subplant curve or equipment model 518 includes adding an additional dimension to the subplant curve or equipment model. For example, a two-dimensional subplant curve or equipment model 518 that defines the relationship between equipment resource production (e.g., chilled water production) and resource consumption (e.g., electricity consumption) can be modified to include a third dimension as shown in FIG. 17. Accordingly, the two-dimensional subplant curve or equipment model 518 may become a three-dimensional subplant curve or equipment model 518 that defines the relationship between equipment resource production (e.g., chilled water production) and resource consumption (e.g., electricity consumption) as a function of a third time-varying variable (e.g., condenser water temperature, chiller lift, outside air temperature, etc.). The values of the third time-varying variable can be estimated or predicted for each time step of the optimization period and provided as an input to the high level optimization process. In this way, the relationship between resource production and resource consumption of a piece of equipment or group of equipment can be defined as a time-varying relationship which depends on the value of the third time-varying variable. Asset allocator 402 can use the modified subplant curve or equipment model to establish the resource production vs. resource consumption constraints when performing the high level optimization process.

Example Use Case #2: Low Level Optimization

Another use case of the dynamic capacity adjustment is to adjust the capacity limits or thresholds used by low level optimizer 534 in the low level optimization process. As discussed above, low level optimizer 534 may receive an asset allocation from asset allocator 402 (e.g., an amount of each resource to be produced by each subplant at each time step of the optimization period) and determine an appropriate set of control decisions (e.g., equipment on/off decisions, operating points, etc.) for each subplant to cause each subplant to produce the requested amounts of each resource. For example, asset allocator 402 may provide low level optimizer 534 with a time series of cooling loads to be served by a chiller subplant. Low level optimizer 534 may determine which individual chillers of the chiller subplant should be turned on or turned off at each time step of the optimization period to meet the requested cooling load at each time step. The decisions made by low level optimizer 534 may be based on the maximum capacity of each individual device. For example, if the requested cooling load at a given time step is 6000 kW of cooling and each chiller has a maximum capacity of 2000 kW, low level optimizer 534 may determine that three chillers within the chiller subplant should be active at that time step.

In some embodiments, adjusting the capacity limits or thresholds used by low level optimizer 534 includes modifying the maximum capacities of individual devices within a subplant, which are considered when performing the low level optimization process. For example, the dynamic capacity adjustment may result in the maximum capacities of each chiller being set to 1800 kW instead of 2000 kW. In this case, low level optimizer 534 may determine that four chillers should be active to satisfy the requested cooling load of 6000 kW. In some embodiments, the maximum capacity value is adjusted as a function of lift (e.g., a difference between chilled water output temperature and condenser water output temperature of a chiller), which can be predicted for each time step of the optimization period. In some embodiments, the maximum capacity value is adjusted as a function of outside air temperature (e.g., outside air wet bulb temperature), which can be predicted for each time step of the optimization period.

In some embodiments, adjusting the capacity limits includes changing the maximum capacity value from a static variable (e.g., a single value for each time step of the optimization period) to a dynamic variable which can have different values at different time steps of the optimization period. For example, the maximum capacity of the equipment can be defined as a time series of capacity values including a value of the maximum capacity for each time step of the optimization period. The value of the maximum capacity at each time step can be modeled or defined as a function of other time-varying values such as the condenser water temperature, the chilled water temperature, the outside air temperature, or any other time-varying value which can be predicted for each time step of the optimization period. Accordingly, the dynamic capacity adjustment techniques described herein can be used to define the maximum capacity of the equipment as a time-varying value and define constraints on the low level optimization process that use different values of the maximum capacity at different time steps.

In some embodiments, the dynamic capacity adjustment can be used to modify the relationship between resource production and resource consumption of a piece of equipment considered by low level optimizer 534 in the low level optimization process. For example, the equipment model 518 for a chiller can be proportionally adjusted or scaled based on a scaling factor (e.g., the ratio between the original maximum capacity of the chiller and the modified maximum capacity of the chiller). Each point on the equipment model 518 can be proportionally adjusted by applying the scaling factor to generate a new (scaled) equipment model 518. The new equipment model 518 can be used by low level optimizer 534 when performing the low level optimization process.

In some embodiments, adjusting the equipment model 518 includes adding an additional dimension to the equipment model. For example, a two-dimensional equipment model 518 that defines the relationship between equipment resource production (e.g., chilled water production) and resource consumption (e.g., electricity consumption) can be modified to include a third dimension as shown in FIG. 17. Accordingly, the two-dimensional equipment model 518 may become a three-dimensional equipment model 518 that defines the relationship between equipment resource production (e.g., chilled water production) and resource consumption (e.g., electricity consumption) as a function of a third time-varying variable (e.g., condenser water temperature, chiller lift, outside air temperature, etc.). The values of the third time-varying variable can be estimated or predicted for each time step of the optimization period and provided as an input to the low level optimization process. In this way, the relationship between resource production and resource consumption of a piece of equipment can be defined as a time-varying relationship which depends on the value of the third time-varying variable. Low level optimizer 534 can use the modified equipment model to determine how many pieces of equipment within each subplant should be active or inactive at each time step and the specific operating points for each piece of equipment (e.g., operate at 20% capacity, operate at 50% capacity, operate at 80% capacity, etc.) to meet the requested amounts of resource production for the subplant at each time step of the optimization period.

Example Use Case #3: Using Capacity Limits as a Controllable Variable

Figure 19:
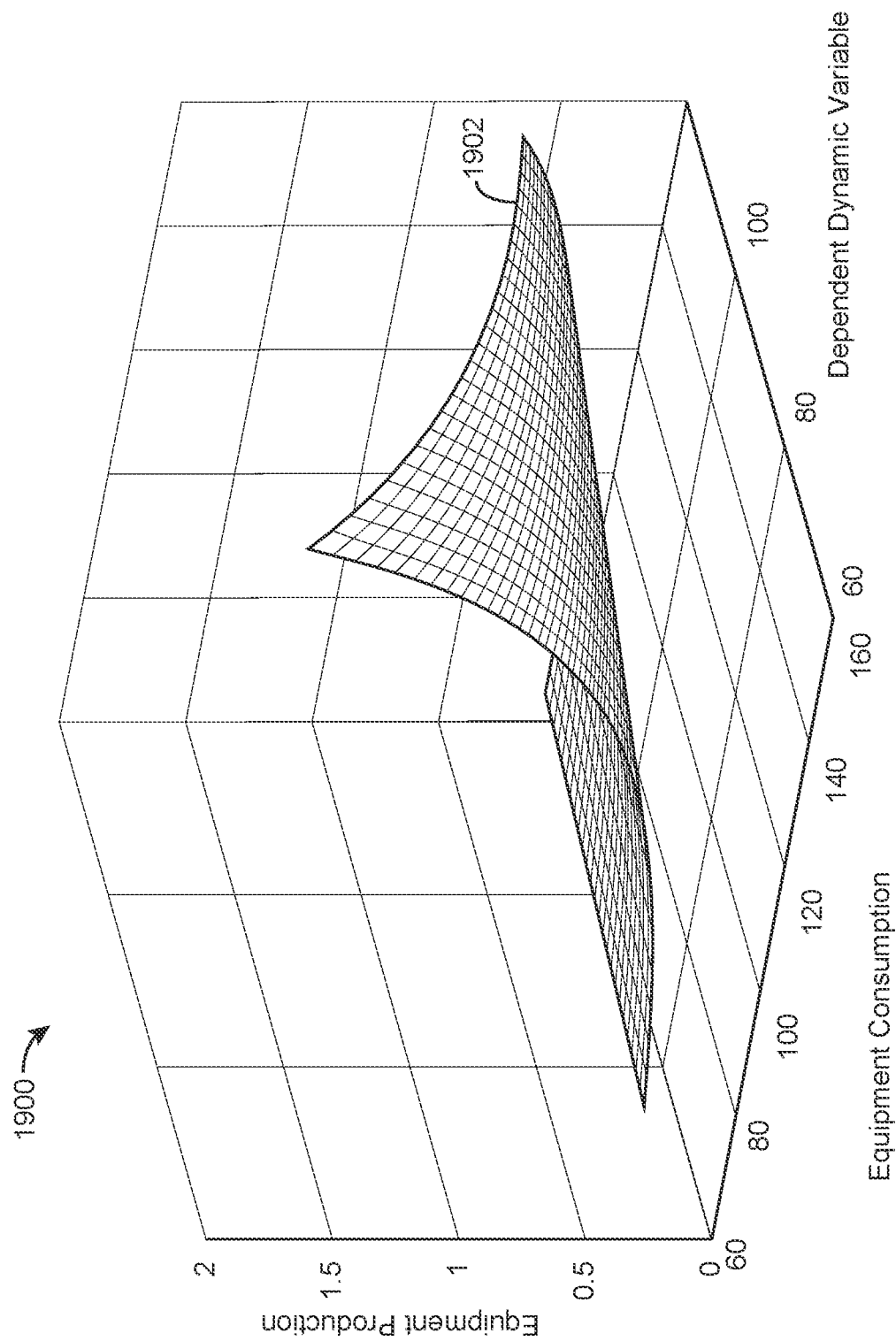
FIG. 19 is a graphical representation of a relationship between production of a first equipment unit, consumption of the first equipment unit, and a dynamic variable dependent on control decisions for a second equipment unit, according to some embodiments.

Another use case of the dynamic capacity adjustment is to consider the capacity limits of the equipment and/or the relationship between resource production and resource consumption for the equipment as a controllable variable that can be influenced by control decisions for other equipment. While some variables that impact the capacity limits and/or subplant curves are not controllable (e.g., outside air wet bulb temperature), others may be subject to control. For example, the capacity limits and/or subplant curve for a chiller subplant may depend on the temperature of the condenser water provided as an input to the chiller subplant via a condenser water circuit. Such a relationship is shown in FIGS. 14-15, or FIG. 19 where the dependent dynamic variable is the condenser water temperature. For systems that include cooling towers or other controllable equipment that operate to remove heat from the condenser water circuit, such equipment can be controlled to modulate the condenser water temperature as a controllable variable. In this way, the capacity limits of the chiller subplant and/or the relationship between resource production and resource consumption of the chiller subplant can be controlled by adjusting the condenser water temperature.

Advantageously, considering the capacity limits of the equipment and/or the relationship between resource production and resource consumption for the equipment as a controllable variable allows asset allocator 402 to make control decisions that consume more energy at one subplant in the interest of causing another subplant to operate more efficiently and thus consume less energy to achieve the same effect. For example, asset allocator 402 can consider a scenario in which a cooling tower subplant is operated to consume more energy to provide a colder condenser water temperature to the chiller subplant, which causes the capacity limits and/or the subplant curve of the chiller subplant to change as discussed above. In this scenario, asset allocator 402 can evaluate the tradeoffs between consuming more energy at the cooling tower subplant and consuming less energy at the chiller subplant as a result of more efficient operation enabled by the colder condenser water temperature. The more efficient operation may be defined by the changes to the subplant curve for the chiller subplant that models the relationship between resource consumption (e.g., electricity consumption) and resource production (e.g., chilled water production, cooling production, etc.) for the chiller subplant.

In operation, asset allocator 402 may modify an initial resource production vs. consumption model (e.g., a subplant curve for a subplant or equipment model for a piece of equipment) to include an additional dimension for a dependent dynamic variable. For example, the initial subplant curve or equipment model may define a two-dimensional relationship between resource production and resource consumption, whereas the modified subplant curve or equipment model may define a three-dimensional relationship between resource production, resource consumption, and the dependent dynamic variable, as shown in FIG. 19. The dependent dynamic variable may be capable of being controlled by asset allocator 402 and may be another decision variable in the high level optimization process.

Asset allocator 402 may use the modified resource production vs. consumption model as a constraint when performing the high level optimization process and may select values of the dependent dynamic variable that optimize the objective function (e.g., lowest total energy consumption or any other control objective). This allows asset allocator 402 to consider tradeoffs between increased energy consumption at a first subplant or group of equipment to achieve a given value of the dependent dynamic variable (e.g., increased energy consumption at a cooling tower subplant to achieve a colder condenser water temperature) and increased efficiency at a second subplant or group of equipment as a result of a more efficient relationship between resource production and resource consumption. For example, as shown in FIG. 19, decreasing the value of the dependent dynamic variable (e.g., condenser water temperature) results in increased resource production (e.g., cooling produced) for the same amount of resource consumption (e.g., electricity consumed) at a first subplant or group of equipment (e.g., chillers), but may result in more energy consumed at a different subplant or group of equipment (e.g., cooling towers).

Asset allocator 402 can consider the impact of adjusting the dependent dynamic variable on both the first subplant or group of equipment and the second subplant or group of equipment when performing the high level optimization process. In this way, asset allocator 402 can generate control decisions for multiple subplants or groups of equipment that interact with each other in a coordinated manner and select a value of the dependent dynamic variable that optimizes the objective function. Like other variables in the high level optimization process, the value of the dependent dynamic variable may vary over time and may have different values at different time steps of the optimization period. Asset allocator 402 can use the values of the dependent dynamic variable at each time step to operate both the first subplant or group of equipment and the second subplant or group of equipment. For example, asset allocator 402 may operate the first supplant or group of equipment to achieve the target value of the dependent dynamic variable (e.g., operate a cooling tower to achieve a target condenser water temperature) and operate the second subplant or group of equipment based on the relationship between resource production and resource consumption that results from the target value of the dependent dynamic variable (e.g., operate a chiller subplant based on the relationship between cooling production and electricity consumption at the target value of the condenser water temperature).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A method for controlling equipment, comprising:
providing a control algorithm comprising a constraint comprising maximum values of production of the equipment for a plurality of time steps;
dynamically adjusting the constraint by updating the maximum values as a function of predicted values of a dynamic variable for the plurality of time steps, wherein the dynamic variable affects an actual maximum production of the equipment; and
determining control decisions for the plurality of time steps by executing the control algorithm; and
controlling the equipment in accordance with the control decisions.

2. The method of claim 1, wherein the method further comprises predicting the predicted values of the dynamic variable based on a weather forecast.

3. The method of claim 1, further comprising obtaining the predicted values of the dynamic variable from a weather forecast.

4. The method of claim 1, wherein the equipment is a chiller and the dynamic variable is a proxy for lift.

5. The method of claim 1, wherein the dynamic variable is an outdoor air temperature.

6. The method of claim 1, further comprising:
obtaining standard equipment specification data published by a manufacturer and indicative of equipment performance under different operating conditions; and
finding parameters of the function based on the standard equipment specification data.

7. The method of claim 1, further comprising affecting the dynamic variable by operating additional equipment, wherein executing the control algorithm further comprises determining additional control decisions for the additional equipment.

8. The method of claim 1, wherein updating the maximum values as the function of the dynamic variable comprises applying the function to a value of the dynamic variable and a maximum consumption of the equipment.

9. The method of claim 8, wherein the maximum consumption is a maximum electrical power usage of the equipment.

10. The method of claim 1, wherein executing the control algorithm comprises performing an optimization subject to the constraint, wherein the control decisions are target values for the production of the equipment.

11. A system, comprising:
equipment operable to produce a resource; and
circuitry programmed to:
provide a control algorithm comprising a constraint comprising maximum values of production of the equipment for a plurality of time steps;
dynamically adjust the constraint by updating the maximum values as a function of predicted values of a dynamic variable for the plurality of time steps, wherein the dynamic variable affects an actual maximum production of the equipment; and
determine control decisions for the plurality of time steps by executing the control algorithm and controlling the equipment in accordance with the control decisions.

12. The system of claim 11, wherein the equipment is a chiller and the dynamic variable affects lift of the chiller.

13. The system of claim 11, further comprising additional equipment configured to produce the resource, wherein the control algorithm allocates a demand for the resource across the equipment and the additional equipment.

14. The system of claim 11, further comprising additional equipment operable to affect the dynamic variable, wherein the circuitry is programmed to coordinate operation of the equipment and the additional equipment based on a dependence of the dynamic variable on control decisions by the circuitry for the additional equipment.

15. The system of claim 11, wherein the circuitry is further programmed to predict the predicted values of the dynamic variable based on a weather forecast.

16. The system of claim 11, wherein the circuitry is further programmed obtain the predicted values of the dynamic variable from a weather forecast.

17. The system of claim 11, wherein the dynamic variable is an outdoor air temperature.

18. The system of claim 11, wherein updating the maximum values as the function of the dynamic variable comprises applying the function to a value of the dynamic variable and a maximum consumption of the equipment.

19. The system of claim 18, wherein the maximum consumption is a maximum electrical power usage of the equipment.

20. The system of claim 11, wherein executing the control algorithm comprises performing an optimization subject to the constraint, wherein the control decisions are target values for the production of the equipment.

* * * * *